US010410427B2

(12) United States Patent
Sisbot

(10) Patent No.: US 10,410,427 B2
(45) Date of Patent: *Sep. 10, 2019

(54) THREE DIMENSIONAL GRAPHICAL OVERLAYS FOR A THREE DIMENSIONAL HEADS-UP DISPLAY UNIT OF A VEHICLE

(71) Applicant: TOYOTA JIDOSHA KABUSHIKI KAISHA, Toyota-shi, Aichi-ken (JP)

(72) Inventor: Emrah Akin Sisbot, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/052,601

(22) Filed: Aug. 1, 2018

(65) Prior Publication Data

US 2018/0342107 A1 Nov. 29, 2018

Related U.S. Application Data

(63) Continuation of application No. 15/080,412, filed on Mar. 24, 2016, now Pat. No. 10,068,377.

(51) Int. Cl.
*B60K 35/00* (2006.01)
*G02B 27/01* (2006.01)
*G06T 19/00* (2011.01)

(52) U.S. Cl.
CPC .......... *G06T 19/006* (2013.01); *B60K 35/00* (2013.01); *G02B 27/01* (2013.01);
(Continued)

(58) Field of Classification Search
CPC . G06T 19/006; G01C 21/365; G06K 9/00671
See application file for complete search history.

(56) References Cited

U.S. PATENT DOCUMENTS 8,427,395 B2   4/2013 Seder et al.
8,521,411 B2   8/2013 Grabowski et al.
(Continued)

FOREIGN PATENT DOCUMENTS

JP   PO2015-215505   12/2015
WO   2015174051      11/2015

OTHER PUBLICATIONS

Schroeter, et al., "The social car: new interactive vehicular applications derived from social media and urban infomatics," Proceedings of the 4th International Conference on Automotive User Interfaces and Interactive Vehicular Applications, ACM, 2012.

*Primary Examiner* — Daniel F Hajnik
(74) *Attorney, Agent, or Firm* — Burbage Law, P.C.; Jon-Michael Burbage; Elizabeth Ruzich

(57) ABSTRACT

The disclosure includes a system and method for wireless data sharing between a mobile client device and a three-dimensional heads-up display unit. A system may include a three-dimensional heads-up display unit ("3D HUD") installed in a vehicle. The system may include a memory storing instructions that, when executed, cause the system to: establish a peer-to-peer video stream between a mobile client device and the vehicle; generate live video data for providing a video stream for causing a screen of the mobile client device to display visual content of the 3D HUD that includes substantially live images depicting what the driver of the vehicle sees when looking at the 3D HUD; and stream the live video data to the mobile client device to cause the screen of the mobile client device to display the video stream that depicts what the driver of the vehicle sees when looking at the 3D HUD.

20 Claims, 14 Drawing Sheets

(52) U.S. Cl.
CPC .............. *B60K 2350/106* (2013.01); *B60K 2350/2052* (2013.01); *B60K 2350/352* (2013.01); *G02B 2027/014* (2013.01)

(56) References Cited

U.S. PATENT DOCUMENTS

| | | |
|---|---|---|
| 9,002,944 B2 | 4/2015 | Lewis et al. |
| 2006/0226968 A1 | 10/2006 | Tengler et al. |
| 2009/0005961 A1 | 1/2009 | Grabowski et al. |
| 2010/0253540 A1 | 10/2010 | Seder et al. |
| 2012/0268262 A1* | 10/2012 | Popovic ............... B60Q 9/008 340/438 |
| 2013/0144657 A1 | 6/2013 | Ricci |
| 2014/0063064 A1 | 3/2014 | Seo et al. |
| 2014/0306814 A1* | 10/2014 | Ricci ................... H04W 4/21 340/425.5 |
| 2014/0362195 A1 | 12/2014 | Ng-Thow-Hing et al. |
| 2015/0186734 A1 | 7/2015 | Nakagawa |
| 2015/0199905 A1* | 7/2015 | Hayee .................. G08G 1/22 701/118 |
| 2015/0208368 A1 | 7/2015 | Khude et al. |
| 2016/0345209 A1 | 11/2016 | Talukdar et al. |
| 2016/0357187 A1 | 12/2016 | Ansari |

* cited by examiner

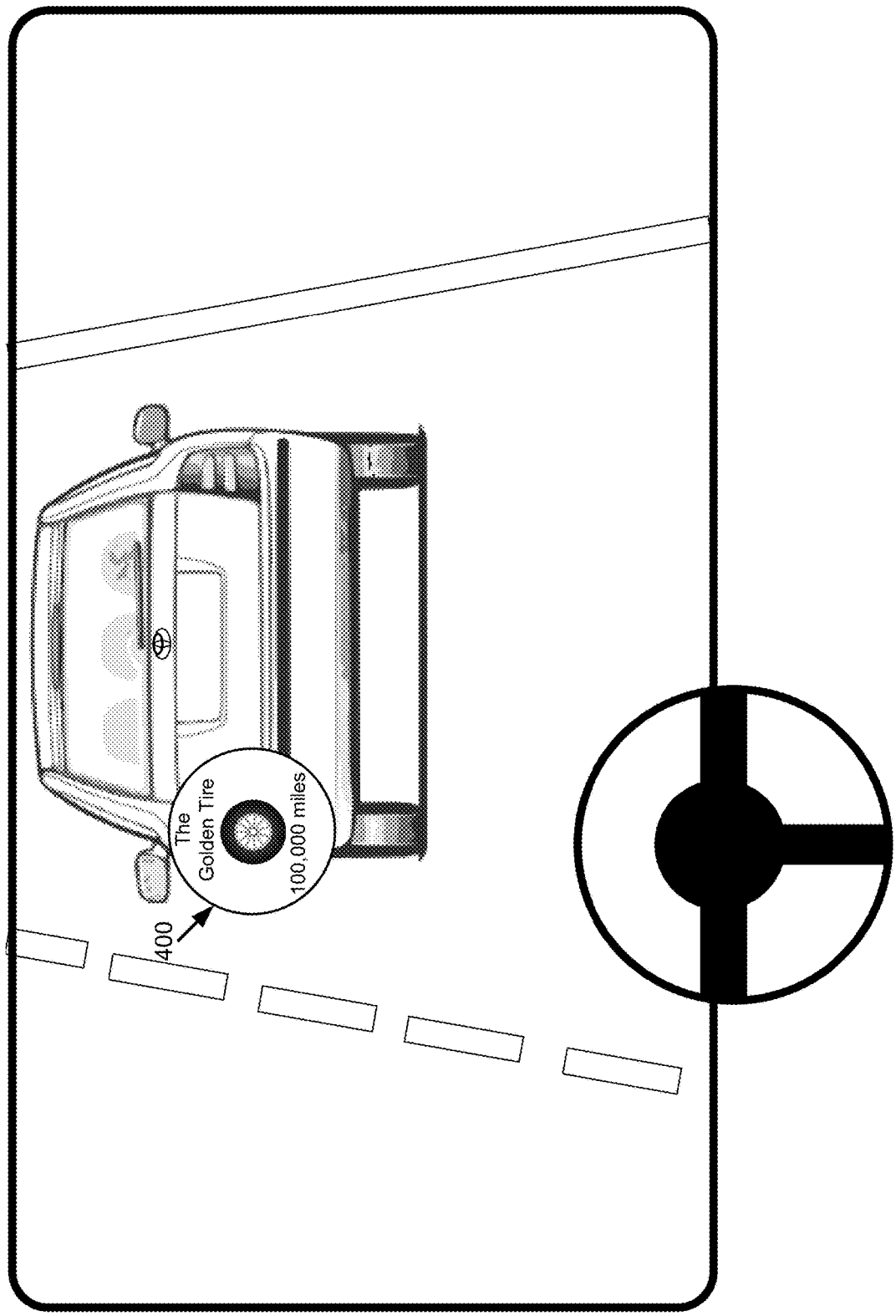

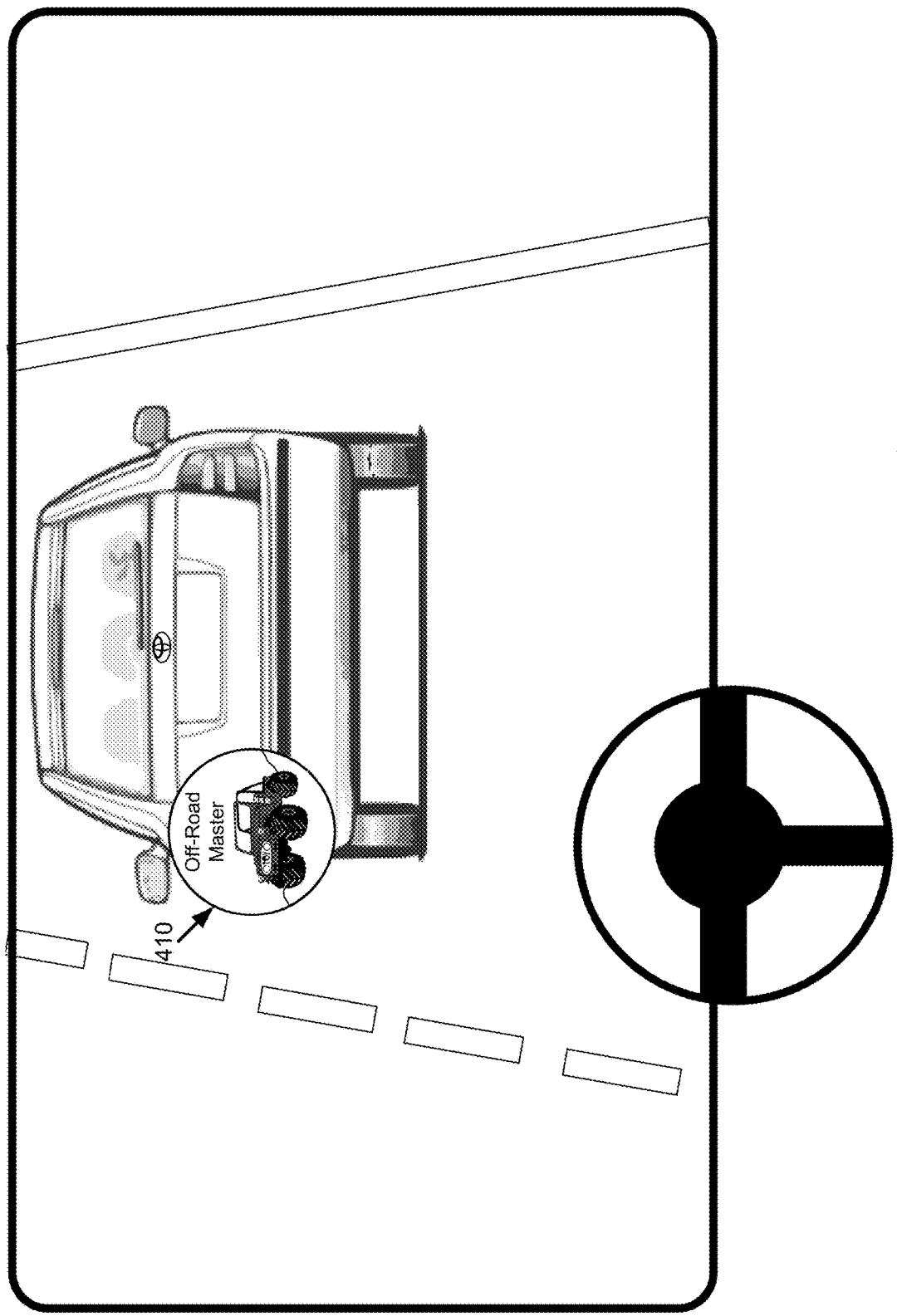

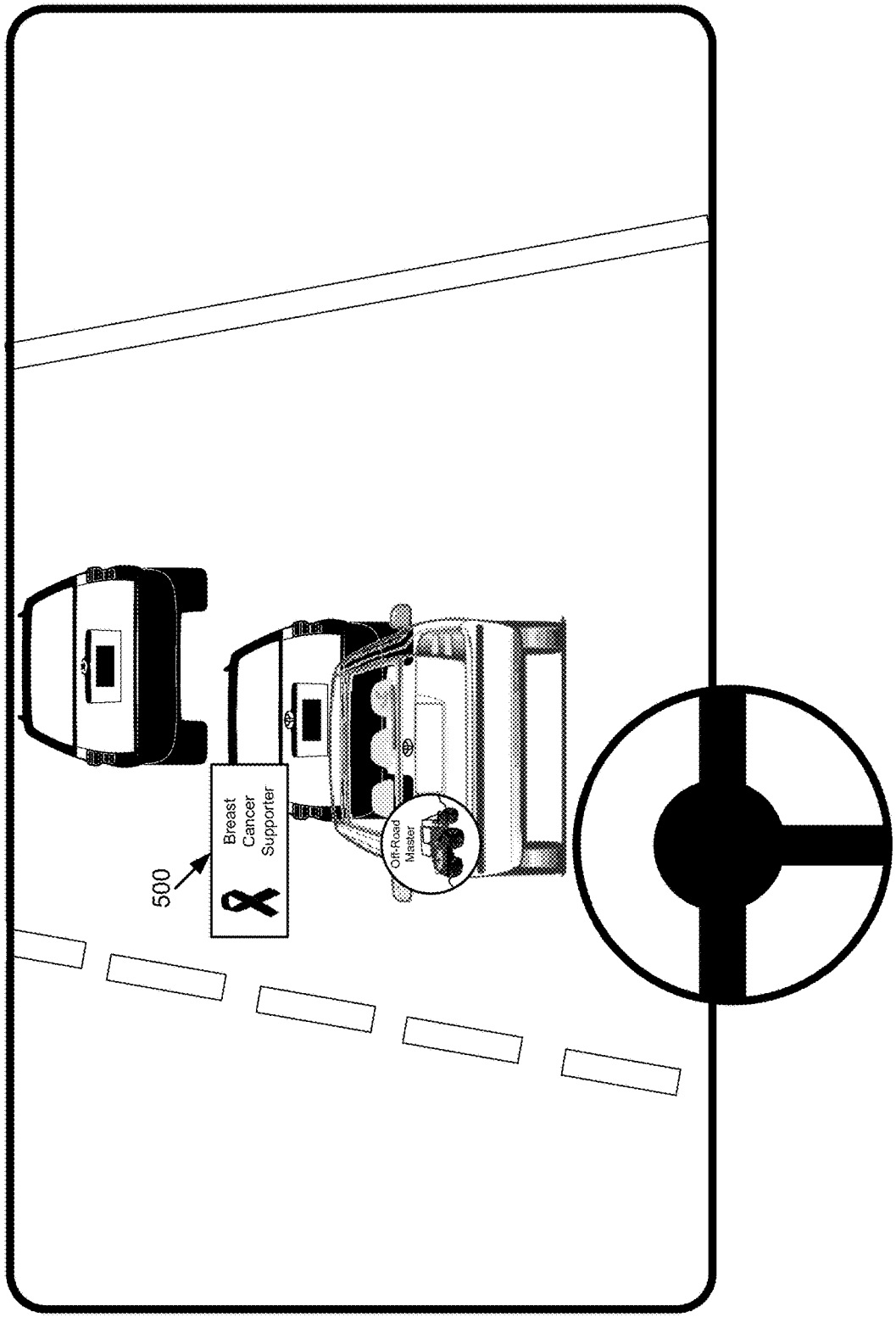

THREE DIMENSIONAL GRAPHICAL OVERLAYS FOR A THREE DIMENSIONAL HEADS-UP DISPLAY UNIT OF A VEHICLE

This patent application is a continuation of U.S. patent application Ser. No. 15/080,412, entitled "Three Dimensional Graphical Overlays for a Three Dimensional Heads-up Display Unit of a Vehicle" filed on Mar. 24, 2016, the entirety of which is hereby incorporated by reference.

BACKGROUND

The specification relates to three dimensional ("3D") graphical overlays for a three dimensional heads-up display unit ("3D HUD") of a vehicle.

Vehicles may be equipped with a heads-up display unit ("HUD"). Drivers may interact with people who are not in their vehicle. For example, a driver may be in a vehicle and interacting with another person who is located many miles away.

SUMMARY

Described are implementations that may include a 3D overlay application for providing graphical overlays for a three dimensional heads-up display unit ("3D HUD") of a vehicle. The graphical overlays are displayed in 3D by the 3D HUD. The 3D HUD displays graphical overlays for nearby vehicles as well as distant vehicles. These graphical overlays may include information that the driver of the vehicle defines. Optionally, for selected users such as law enforcement, the graphical overlays may include information about the car and the driver that is not defined by the driver.

In some implementations, a vehicle called "Vehicle A" travels down the roadway. The driver of Vehicle A looks through the 3D HUD of Vehicle A. Other vehicles are viewable by the driver of Vehicle A as they look through the 3D HUD. When viewed in the 3D HUD by the driver of Vehicle A, the other vehicles have graphical overlays that are associated with them in a cloud server. A 3D overlay application of Vehicle A may perform one or more of the following steps: (1) the 3D overlay application identifies the other vehicles and (2) the 3D overlay application wirelessly retrieves the graphical overlay associated with these other vehicles from the cloud server. The 3D overlay application causes the 3D HUD of Vehicle A to display the graphical overlays for the other vehicles in three dimensions (herein "3D").

In some implementations, vehicle owners can choose to associate "3D digital bumper stickers" with their vehicles. For example, if a vehicle owner supports a social cause (e.g., pink ribbon for breast cancer awareness) then they can associate a related 3D digital bumper sticker with their vehicle. When their vehicle is viewed through the 3D HUD a 3D digital bumper sticker will appear as a graphical overlay for that vehicle (e.g., a pink ribbon will appear for their vehicle when viewed through the 3D HUD). These 3D digital bumper stickers may be something that customers are willing to purchase.

In some implementations, vehicle owners can choose to associate "3D digital badges of accomplishment" with their vehicles. These 3D digital badges of accomplishment may advertise an accomplishment of the driver or the vehicle. For example, if the vehicle has 100,000 miles on the odometer the driver may be proud of this fact and therefore choose to associate a 3D digital badge of accomplishment to advertise that their vehicle has over 100,000 miles on the odometer.

In some implementations, the 3D HUD may include software to enable features like pinch to zoom (when the vehicle is stopped) and hand gestures. For example, if a vehicle being viewed through a 3D HUD has many digital bumper stickers or many digital badges of accomplishment, the driver may wave their hand from left to right (e.g., when the vehicle is stopped) to cycle through the various digital bumper stickers or digital badges of accomplishment for that vehicle.

In some implementations, a 3D overlay system described herein may include the 3D overlay application, 3D superposition display technology and a 3D HUD that follows both vehicle's positions and refreshes the locations of the 3D overlays displayed in the 3D HUD in real-time or substantially real time. In some implementations, the display technology places the 3D overlay right at the target vehicle by calculating the correct parallax and focus at the same time. The distance to the target vehicle may be used by the 3D HUD to display the 3D overlay on the 3D HUD.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method including: determining an identity of a second vehicle that is viewable by a first driver of a first vehicle through a 3D HUD of a first vehicle that is driven by the first driver; identify 3D overlay data associated with the second vehicle based on the identity of the second vehicle; and displaying a 3D overlay in the 3D HUD of the first vehicle based on the 3D overlay data, where the 3D overlay is selected by a second driver of the second vehicle and the 3D overlay is displayed in the 3D HUD at a first location in the 3D HUD that is proximate to a second location of the second vehicle in the 3D HUD as viewed by the first driver. Other embodiments of this aspect include corresponding computer systems, apparatus, and computer programs recorded on one or more computer storage devices, each configured to perform the actions of the methods.

Implementations may include one or more of the following features. The method where the second vehicle and the first vehicle are communicatively coupled to an overlay server via a wireless network, where the second vehicle periodically updates the overlay server by transmitting location data to the overlay server via the wireless network, where the location data describes a geographic location of the second vehicle and the overlay server provides the location data to the first vehicle to via the wireless network, where the first vehicle analyzes the location data to determine the identity of the second vehicle. The method where the 3D overlay includes a digital bumper sticker selected by the second driver of the second vehicle. The method where the 3D overlay includes a badge of accomplishment that is earned by one or more of the second driver and the second vehicle. The method where the second vehicle is separated on a roadway from the first vehicle by one or more other vehicles. The method where the second vehicle is not viewable by the first driver through the 3D HUD. The method where the first vehicle and the second vehicle are manufactured by a same company and a three dimensional overlay feature ("3D overlay feature") of the 3D HUD is only operable if both the first vehicle and the second vehicle are manufactured by the same company. The method where the 3D overlay is animated. The method where the first vehicle is associated with a governmental agency, where the 3D overlay is not selected by the second driver and the 3D overlay describes a legal status of one or more of the second driver and the second vehicle. The method where the second vehicle transmits the 3D overlay data to the first vehicle via a wireless communicative coupling shared between the first vehicle and the second vehicle, and the first vehicle identifies the second vehicle based on receipt of the 3D overlay data. The method where the wireless communicative coupling includes dedicated short range communication ("DSRC"). The method where the wireless communicative coupling includes millimeter wave communication ("mm-Wave communication"). Implementations of the described techniques may include hardware, a method or process, or computer software on a computer-accessible medium.

One general aspect includes a computer program product including a non-transitory computer-usable medium including a computer-readable program, where the computer-readable program when executed on a computer causes the computer to: determine an identity of a second vehicle that is viewable by a first driver of a first vehicle through a 3D HUD of a first vehicle that is driven by the first driver; identify 3D overlay data associated with the second vehicle based on the identity of the second vehicle; and display a 3D overlay in the 3D HUD of the first vehicle based on the 3D overlay data, where the 3D overlay is selected by a second driver of the second vehicle and the 3D overlay is displayed in the 3D HUD at a first location in the 3D HUD that is proximate to a second location of the second vehicle in the 3D HUD as viewed by the first driver. Other embodiments of this aspect include corresponding computer systems, apparatus, and computer programs recorded on one or more computer storage devices, each configured to perform the actions of the methods.

Implementations may include one or more of the following features. The computer program product where the second vehicle and the first vehicle are communicatively coupled to an overlay server via a wireless network, where the second vehicle periodically updates the overlay server by transmitting location data to the overlay server via the wireless network, where the location data describes a geographic location of the second vehicle and the overlay server provides the location data to the first vehicle to via the wireless network, where the first vehicle analyzes the location data to determine the identity of the second vehicle. The computer program product where the overlay server periodically transmits the location data to the first vehicle and the 3D HUD uses the location data to track the location of the second vehicle in the 3D HUD and update the location of the 3D overlay in the 3D HUD based on the location data. The computer program product where the second vehicle and the first vehicle are communicatively coupled to an overlay server via a wireless network, where the second driver provides one or more inputs to the second vehicle to select the 3D overlay, where the second vehicle wirelessly transmits input data to the overlay server via the wireless network, where the input data describes a selection of the 3D overlay by the second driver. The computer program product where the overlay server transmits the 3D overlay data to the first vehicle via the wireless network. The system where the 3D overlay data is stored locally on the second vehicle and the second vehicle wirelessly transmits the 3D overlay data to the first vehicle. Implementations of the described techniques may include hardware, a method or process, or computer software on a computer-accessible medium.

One general aspect includes a system including: a 3D HUD installed in a first vehicle; a camera mounted to a first vehicle and configured to determine what a first driver of the first vehicle sees when looking through the 3D HUD; and a memory storing instructions that, when executed, cause the system to: determine an identity of a second vehicle that is viewable by the first driver of the first vehicle through the 3D HUD of the first vehicle that is driven by the first driver; identify 3D overlay data associated with the second vehicle based on the identity of the second vehicle; and display a 3D overlay in the 3D HUD of the first vehicle based on the 3D overlay data and camera data that describes what the first driver of the first vehicle sees when looking through the 3D HUD, where the 3D overlay data includes graphical information for causing the 3D HUD to display the 3D overlay, where the 3D overlay is selected by a second driver of the second vehicle and the 3D overlay is displayed in the 3D HUD at a first location in the 3D HUD that is proximate to a second location of the second vehicle in the 3D HUD as viewed by the first driver. Other embodiments of this aspect include corresponding computer systems, apparatus, and computer programs recorded on one or more computer storage devices, each configured to perform the actions of the methods.

Implementations may include one or more of the following features. The system where the 3D overlay data is stored locally on the second vehicle and the second vehicle wirelessly transmits the 3D overlay data to the first vehicle. The system where first vehicle includes a second camera that is mounted to the first vehicle and the second camera captures a first image of the second vehicle, where the memory stores further instructions that, when executed, cause the system to determine the identity of the second vehicle based on the first image and image recognition data that describes one or more known vehicles. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4A through 4C are graphic representations of example 3D badges of accomplishment displayed in the 3D HUD according to some implementations.

FIG. 5A is a graphic representation of an example 3D digital bumper sticker displayed in the 3D HUD for a second vehicle that is more than one vehicle in front of the first vehicle according to some implementations.

DETAILED DESCRIPTION

A first vehicle may include a 3D overlay application and a 3D HUD. The 3D overlay application may generate 3D overlays for display on the 3D HUD. For example, the first vehicle travels down the roadway. The driver of the first vehicle looks through the 3D HUD. Other vehicles are viewable by the driver as they look through the 3D HUD. The other vehicles have 3D overlays that are associated with them in a cloud server. The 3D HUD displays the 3D overlays that are then viewable by the driver who is looking through the 3D HUD. The 3D HUD may display 3D overlays for nearby vehicles as well as distant vehicles. For example, even vehicles that are not viewable in the 3D HUD by the driver may have a 3D overlay displayed in the 3D HUD by the 3D overlay application.

Figure 3A:
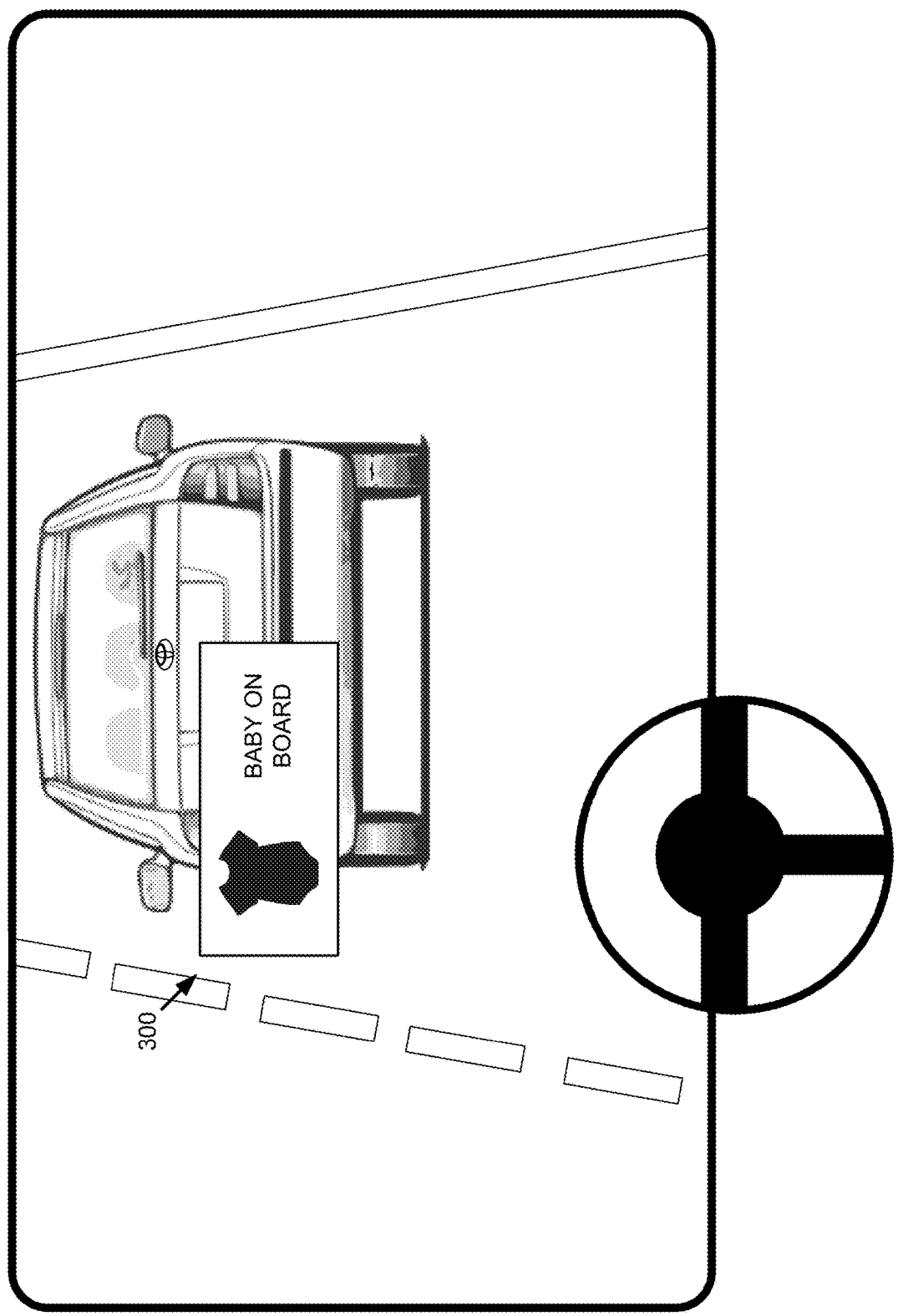
FIGS. 3A through 3C are graphic representations of example 3D digital bumper stickers displayed in a 3D HUD according to some implementations.
Figure 3B:
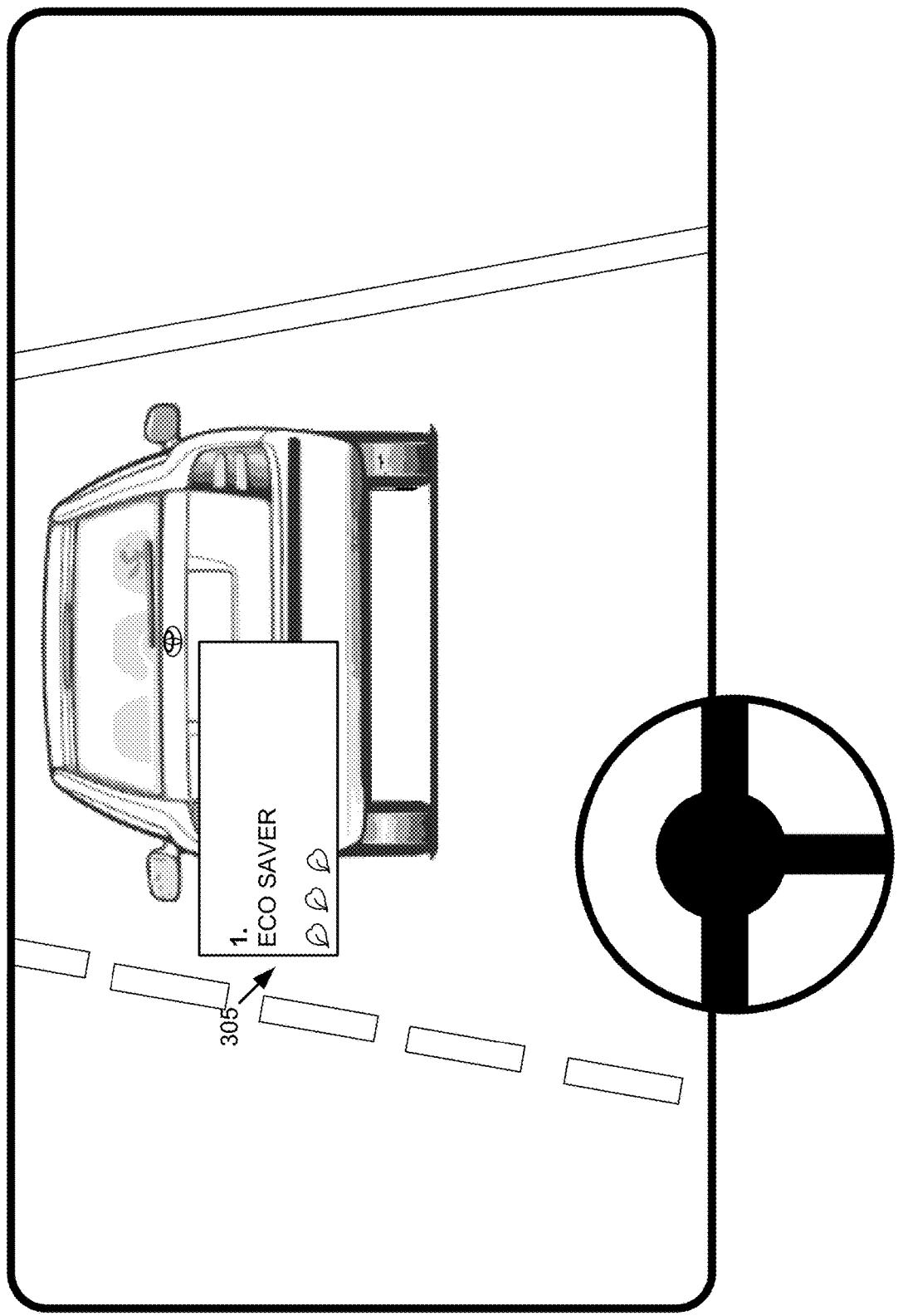
Figure 3C:
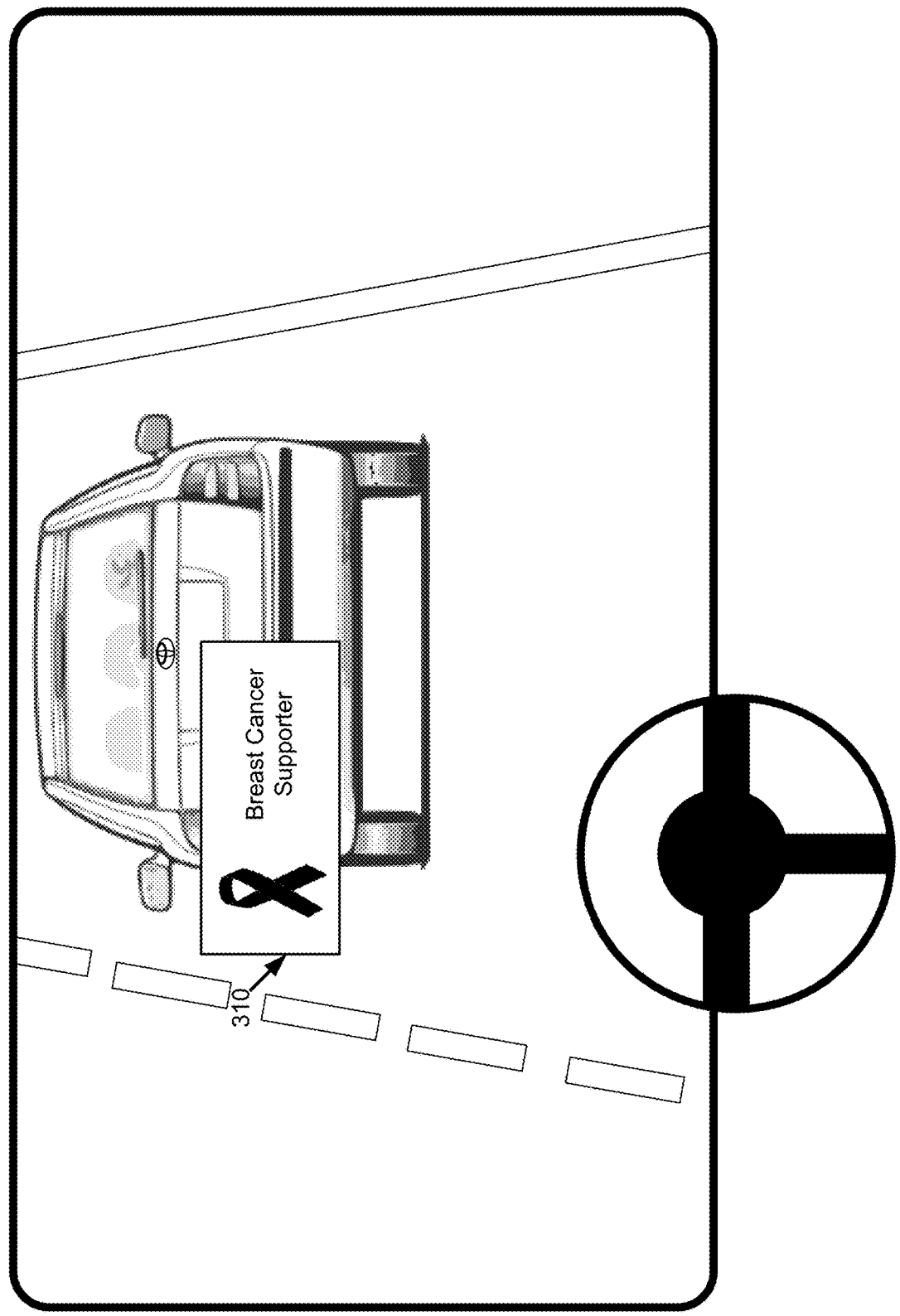
Figure 4B:
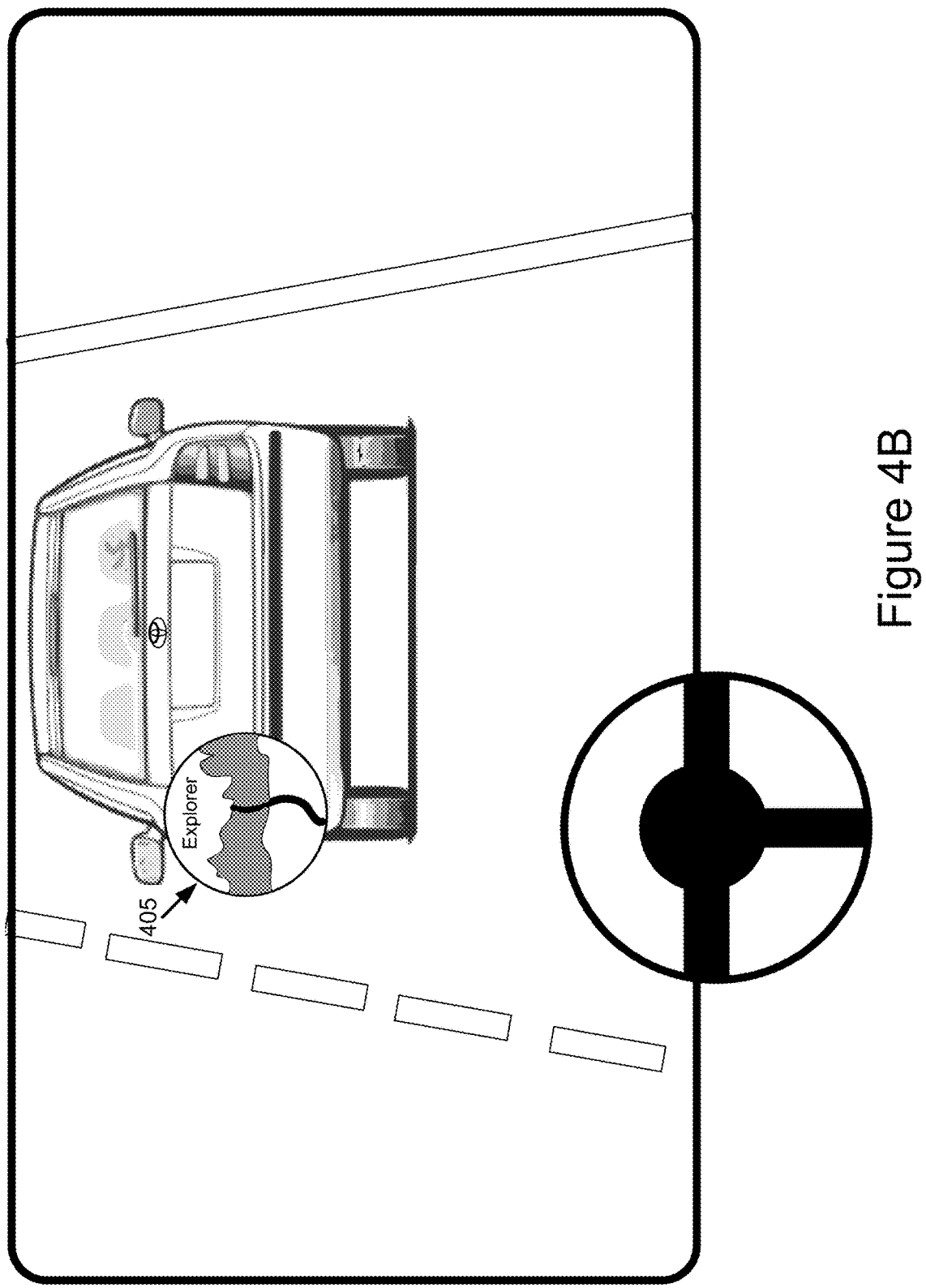

Example graphical overlays are described below. FIGS. 3A through 3C depict examples of "3D digital bumper stickers" whereas FIGS. 4A through 4C depict examples of "3D digital badges of accomplishments." These are only examples and not intended to be limiting. Other graphical overlays are possible. In all examples, the 3D overlay application causes the 3D HUD of the vehicle to display the graphical overlays in 3D.

3D digital bumper stickers will now be described according to some implementations. Drivers can choose to associate "3D digital bumper stickers" with their vehicles. 3D digital bumper stickers can allow drivers to decorate and personalize their vehicles without damaging the exterior of their vehicle. For example, if a vehicle owner supports a social cause (e.g., pink ribbon for breast cancer awareness) then they can associate a related 3D bumper sticker with their vehicle. When their vehicle is viewed through the 3D HUD a virtual overlay will appear as a graphical overlay for that vehicle (e.g., a pink ribbon will appear for their vehicle when viewed through the 3D HUD). These 3D digital bumper stickers may be something that customers are willing to purchase.

In some implementations, 3D digital bumper stickers can be an opportunity for fun and an exclusive form of communication between drivers who share a common association. For example, in some implementations only drivers of the same make or model of vehicle may view one another's 3D digital bumper stickers.

Optionally, a driver can set permissions so that their 3D digital bumper stickers are only viewable by the people they select.

3D digital badges of accomplishment will now be described according to some implementations. Drivers can choose to associate "3D digital badges of accomplishment" with their vehicles. These 3D digital badges of accomplishment may include an advertisement or announcement of an accomplishment of the driver or the vehicle.

In some implementations, a 3D badge of accomplishment may allow a driver to advertise the places they have been and the achievements they have gained. For example, if the vehicle has 100,000 miles on the odometer the driver may be proud of this fact. The driver may choose to associate a 3D digital badge of accomplishment to advertise that their vehicle has over 100,000 miles on the odometer.

Optionally, the 3D digital overlays displayed on the 3D HUD can be rendered as 3D models and shown with subtle animations that are not overly distracting for drivers that view the animations.

In some implementations, nearby vehicles and distant vehicles have overlays that are viewable via the 3D HUD. For example, for distant vehicles a digital callout may be generated pointing to the distant vehicle and the digital bumper sticker or badge of accomplishment for the distant vehicle. See, for example, FIG. 5B in which the distant vehicle is not viewable in the 3D HUD because a semi-truck separates the first vehicle from the distant vehicle (which is also the second vehicle in this example).

A 3D overlay application may be stored in a non-transitory memory of a first vehicle. The first vehicle may also include the 3D HUD. The first vehicle may be driven by a first driver.

A second vehicle is a viewable by the first driver via the 3D HUD. The second vehicle is driven by the second driver. The second driver uses the 3D overlay assignment software to select a 3D digital overlay to associate with the second vehicle. The 3D overlay assignment software may be accessible via a head unit of the second vehicle, a smartphone, a smartwatch, a tablet computer, a laptop or some other processor-based computing device.

For example, the second driver uses the head unit of the second vehicle to access the 3D overlay assignment software and select a 3D digital overlay to associate with the second vehicle. The selection is then stored on an overlay server as overlay data associated with the second driver or the second vehicle. The overlay data stored on the overlay server may aggregate data received from a plurality of second client devices 188.

The first vehicle, second vehicle and the overlay server may be wirelessly connected via a network. The network may include a Wi-Fi connection, mobile data connection (3G, 4G or LTE), etc.

Assume the first vehicle and the second vehicle are driving on the same roadway so that the second vehicle is viewable by the first driver via the 3D HUD. The second vehicle may be nearby the first vehicle (e.g., a few meters) or distant from the first vehicle (e.g., many cars ahead of the first vehicle).

In some implementations, the 3D overlay application determines the identity of the second vehicle. For example, the 3D overlay assignment software present of the second vehicle periodically provides GPS data to the overlay server. The GPS data describes the location of the second vehicle to the overlay server. The 3D overlay application present on the first vehicle also periodically provides GPS data to the overlay server. The GPS data describes the location of the first vehicle to the overlay server.

In some implementations, the GPS data provided by the second vehicle and the first vehicle may be provided in real time or near real time to optimize the performance of my invention.

In some implementations, the overlay server determines which vehicles are in the same geographic area as the first vehicle. The overlay server provides (1) identifying information to the first vehicle so that the 3D overlay application can determine the identities of the vehicles viewable in the 3D HUD and (2) graphical data for displaying the 3D digital overlays associated with the identified vehicles in the 3D HUD. The 3D overlay application of the first vehicle may cause the 3D HUD to render the graphics for the 3D digital overlays for viewing by the first driver. Optionally, the graphical data may include data for displaying animated 3D digital overlays. The animation is subtle so that the First Driver is not distracted.

The overlay server may continuously update the first vehicle about the location of the second vehicle so that the 3D overlay application can track the location of the second vehicle and move the graphic for the 3D overlay associated with the second vehicle in real time (or near real time) so that the 3D overlays displayed by the 3D HUD remain up to date over time.

In some implementations, the second vehicle and the first vehicle may establish a wireless communicative coupling (e.g., DSRC, mmWave communication, mobile data connection, Bluetooth connection, etc.) so that the second vehicle may update the first vehicle about the location of the second vehicle in real time or near real time without having to use the overlay server. For example, the second vehicle may transmit data describing the GPS coordinates of the second vehicle to the first vehicle. In some implementations, the overlay data stored in the overlay server may be stored locally on the second vehicle and transmitted to the first vehicle so that the overlay server is not used.

In some implementations, the first vehicle includes sensors to localize and track the vehicles viewable by the driver in the 3D HUD. Individual vehicles may be identified based on unique information such as their license plates. The 3D overlay application of the first vehicle can analyze the images captured by the external sensors to isolate individual vehicles and associate the identifying information with second vehicle.

System Overview

Figure 1:
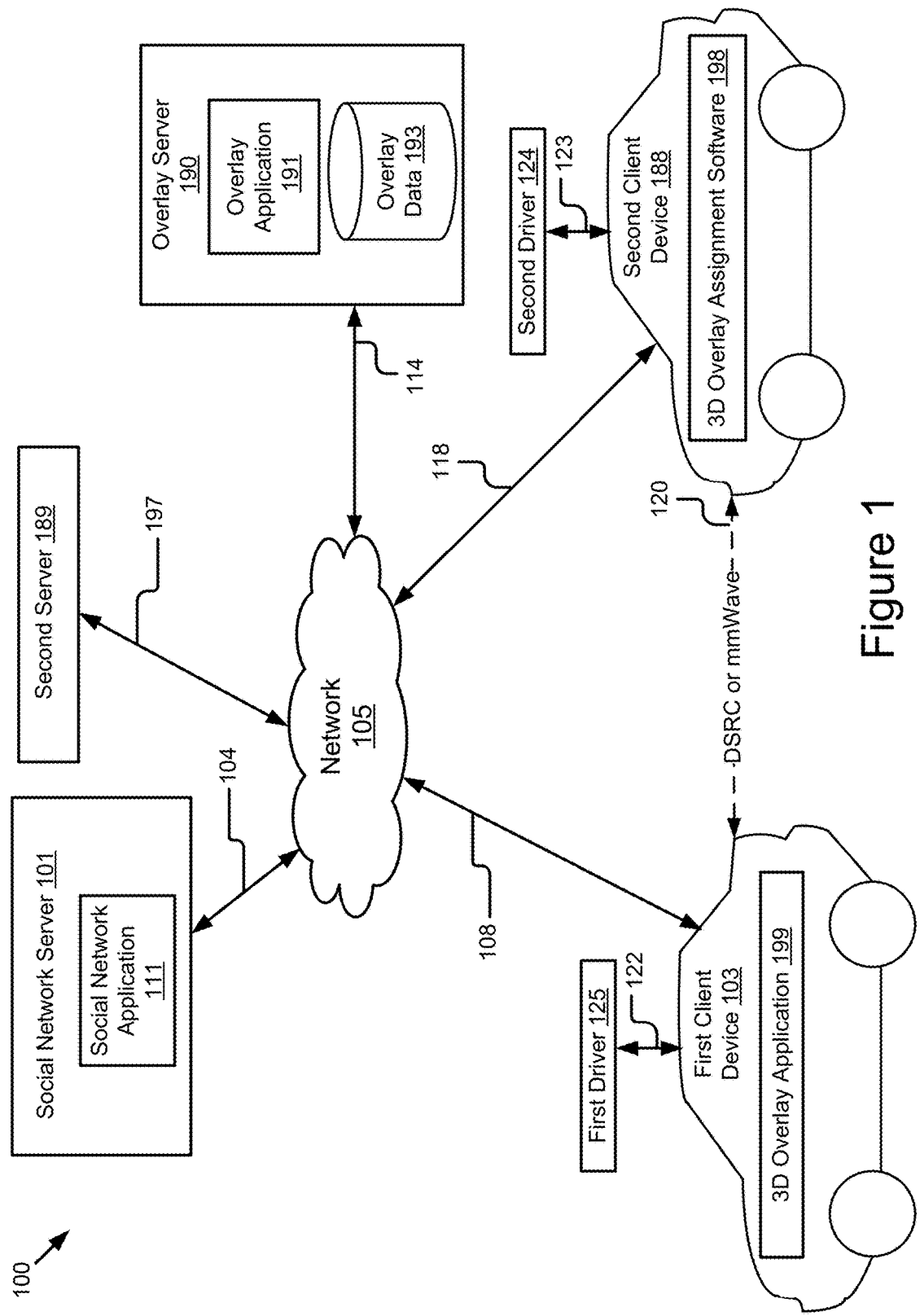
FIG. 1 is a block diagram illustrating an example operating environment for a 3D overlay application according to some implementations.

FIG. 1 is a block diagram illustrating an example operating environment 100 for a 3D overlay application 199 according to some implementations.

The operating environment 100 includes a first client device 103, a second client device 188, a social network server 101, a second server 189, and an overlay server 190. The first client device 103 and the second client device 188 can be accessed by a first driver 125 and a second driver 124, via signal lines 122 and 123, respectively. In the illustrated implementation, these entities of the operating environment 100 may be communicatively coupled via a network 105. The operating environment 100 may include other servers or devices not shown in FIG. 1 including, for example, a traffic server for providing traffic data, a weather server for providing weather data, a power service server for providing power usage service (e.g., billing service), and a map server for providing map data, etc.

The first client device 103 and the second client device 188 in FIG. 1 can be used by way of example. While FIG. 1 illustrates two client devices 103 and 188, the disclosure applies to a system architecture having one or more client devices 103, 188. Furthermore, although FIG. 1 illustrates one network 105 coupled to the first client device 103, the second client device 188, the social network server 101, the second server 189, and the overlay server 190, in practice one or more networks 105 can be connected to these entities. While FIG. 1 includes one social network server 101, one second server 189, and one overlay server 190, the operating environment 100 could include one or more social network servers 101, one or more second servers 189, and one or more overlay servers 190.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a GPS satellite for providing GPS navigation to the first client device 103 or the second client device 188. The network 105 may be a mobile data network such as 3G, 4G, LTE, Voice-over-LTE ("VoLTE"), Dedicated Short Range Communication ("DSRC"), millimeter wave communication ("mmWave communication"), or any other mobile data network or combination of mobile data networks.

In some implementations, the operating environment 100 may include a GPS satellite for providing GPS location data to the first client device 103 or the second client device 188 that describes the geographic location of the first client device 103 or the second client device 188, respectively.

In some implementations, a 3D overlay application 199 can be operable on the first client device 103. The first client device 103 can be a mobile client device with a battery system. For example, the first client device 103 can be one of a vehicle (e.g., an automobile, a bus), a bionic implant, or any other mobile system including non-transitory computer electronics and a battery system. In some implementations, the first client device 103 may include a computing device that includes a memory and a processor. In the illustrated implementation, the first client device 103 is communicatively coupled to the network 105 via signal line 108.

In other implementations, a 3D overlay assignment software 198 can be operable on the second client device 188. The first client device 103 can be a mobile client device with a battery system. For example, the first client device 103 can be one of a vehicle (e.g., an automobile, a bus), a bionic implant, or any other mobile system including non-transitory computer electronics and a battery system. In some implementations, the first client device 103 may include a computing device that includes a memory and a processor. In the illustrated implementation, the second client device 188 is communicatively coupled to the network 105 via a signal line 118.

In some implementations, the first client device 103 may include one or more sensors (e.g., the sensor set 233 depicted in FIG. 2A), such as a navigation sensor (e.g., a global positioning system (GPS) sensor), an infrared detector, a camera, a motion detector, a thermostat, a sound detector, one or more cameras, and any other type of sensors. For example, the first client device 103 may include sensors for measuring one or more of a current time, a location (e.g., a latitude, longitude, and altitude of a location), an acceleration of a vehicle, a velocity of a vehicle, a fuel tank level, and a battery level of a vehicle, etc. The sensors may capture images of the second client device 188, the first driver 125, the eyes or gaze of the first driver 125, a 3D HUD included in the first client device 103 (e.g., the 3D HUD depicted in FIGS. 2A and 2B). The sensors may include a LIDAR sensor or a range finder configured to determine a distance between the first client device 103 and the second client device 188. The sensors can be used to create or generate sensor data (e.g., sensor data 293 depicted in FIG. 2A) that is stored in a non-transitory memory. The sensor data may also include any information obtained during travel or received from the social network server 101, the second server 189, the overlay server 190, or the second client device 188.

In some implementations, the vehicle may include one or more cameras that are mounted to the vehicle to capture one or more images that depict what the driver sees when looking through (or at) the 3D HUD. For example, the images may depict one or more of the following: (1) the real world that the driver sees when looking through the 3D HUD; and (2) the graphical overlays that the driver sees when looking through the 3D HUD.

The 3D overlay application 199 can be software for causing a 3D HUD of the first client device 103 to display a 3D overlay associated with the second client device 188 or a second driver 124 of the second client device 188. The 3D overlay application 199 is described in more detail below with reference to FIG. 2A.

The 3D overlay assignment software 198 can be software used for associating a 3D overlay with the second driver 124 or the second client device 188. For example, the second driver 124 may use the 3D overlay assignment software 198 to associate a graphical overlay with the second client device 188 and set a security setting for the 3D overlay that defines which first client devices 103 may view the 3D overlay via their onboard 3D HUD. These associations and settings may be stored as overlay data 193 on a non-transitory memory of one or more of the second client device 188, the overlay server 190 and the first client device 103.

In some implementations, the 3D overlay assignment software 198 may be a mobile application installed on a smartphone, a smart device or some other processor-based computing device of the second driver 124. For example, the 3D overlay assignment software 198 may be a thin client installed on a smartphone.

In some implementations, the 3D overlay assignment software 198 may determine the GPS coordinates for the second client device 188 and transmit this information to the overlay server 190 or the first client device 103. The 3D overlay assignment software 198 may provide these entities with periodic or regular updates describing the GPS coordinates of the second client device 188.

In some implementations, the 3D overlay assignment software 198 may transmit DSRC or mmWave communications to the first client device as represented by signal line 120.

The 3D overlay assignment software 198 is described in more detail below with reference to FIG. 2C.

In some implementations, one or more of the 3D overlay application 199 or the 3D overlay assignment software 198 can be implemented using hardware including a field-programmable gate array ("FPGA") or an application-specific integrated circuit ("ASIC"). In some other implementations, one or more of the 3D overlay application 199 or the 3D overlay assignment software 198 can be implemented using a combination of hardware and software. One or more of the 3D overlay application 199 or the 3D overlay assignment software 198 may be stored in a combination of the devices and servers, or in one of the devices or servers.

In some implementations, the second client device 188 may include one or more sensors (not shown), such as a GPS sensor, an infrared detector, a camera, a motion detector, a thermostat, a sound detector, and any other type of sensors. For example, the second client device 188 may include a GPS sensor to determine the geographic location of the second client device 188.

The social network server 101 can be a hardware server that includes a processor, a memory, and network communication capabilities. In the illustrated implementation, the social network server 101 is coupled to the network 105 via a signal line 104. The social network server 101 sends and receives data to and from other entities of the operating environment 100 via the network 105.

The social network server 101 includes a social network application 111. A social network can be a type of social structure where the first driver 125 and the second driver 124 may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

In some implementations, the social network application 111 generates a social network that may be used for determining traffic updates. For example, the social network application 111 could be a microblog where people post about accidents on major highways, a forum where people discuss speed traps, a social network where the user has friends that talk about congested surface roads, etc. In some implementations, the 3D overlay application 199 enables the first driver 125 and the second driver 124 to interact or collaborate with one another inside the social network via an interface of the 3D HUD. For example, the chat session in which the first driver 125 and the second driver 124 collaborate may be provided via the social network application 111.

It is understood that the social network server 101 and the social network application 111 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

The overlay server 190 can be a hardware server that includes a processor, a memory, and network communication capabilities. In the illustrated implementation, the overlay server 190 is coupled to the network 105 via a signal line 114. The overlay server 190 sends and receives data to and from other entities of the operating environment 100 via the network 105.

The overlay server 190 includes an overlay application 191 and overlay data 193. The overlay application 191 may include software for storing overlay data 193 received from the second client device 188 and providing the overlay data 193 to the first client device 103.

The overlay data 193 may include one or more of the following: data that defines the associations between the second driver 124 and a 3D overlay; data that defines associations between the second client device 188 and a 3D overlay; a security setting for the 3D overlay as defined by the second driver 124; location data that describes one or more sets of GPS coordinates for the second client device 188; graphical data that describes one or more 3D overlays and is operable to cause the 3D HUD to display the one or more 3D overlays; and graphical data that describes one or more animated 3D overlays and is operable to cause the 3D HUD to display the one or more animated 3D overlays.

In some implementations, the overlay server 190 may be operated by a manufacturer of the first client device 103 and the second client device 188, or an affiliate of the manufacturer.

In some implementations, the overlay server 190 may be operated by a government agency (e.g., law enforcement).

In some implementations, the operating environment 100 includes a second server 189 that is coupled to the network via signal line 197. The second server 189 may store additional information that is used by the 3D overlay application 199, such as map information, navigation, weather information, infotainment, music, etc. In some implementations, the second server 189 receives a request for data from the 3D overlay application 199 (e.g., data for streaming a movie, music, etc.), generates the data, and transmits the data to the 3D overlay application 199.

Example Systems

Figure 2A:
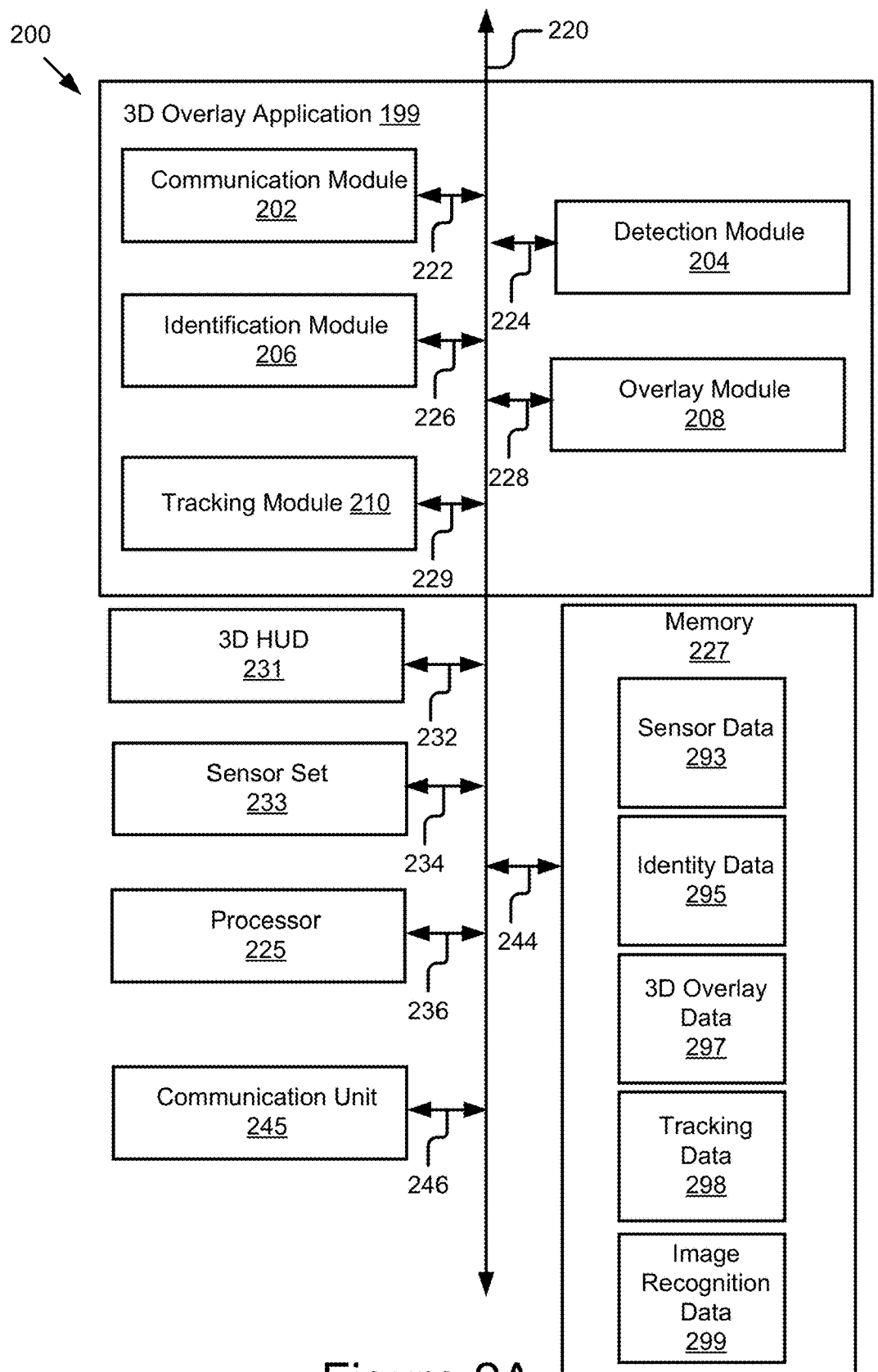
FIG. 2A is a block diagram illustrating an example computer system including a 3D overlay application according to some implementations.

Referring now to FIG. 2A, an example of a computer system 200 including the 3D overlay application 199 is depicted.

FIG. 2A is a block diagram of a computer system 200 that includes the 3D overlay application 199, a processor 225, a memory 227, a 3D HUD 231, a sensor set 233 and a communication unit 245 according to some examples. The components of the computer system 200 are communicatively coupled by a bus 220. In some implementations, the computer system 200 can be the first client device 103.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 236. The processor 225 processes data signals and may include various computing architectures including a complex instruction set computer (CISC) architecture, a reduced instruction set computer (RISC) architecture, or an architecture implementing a combination of instruction sets. The processor 225 may include a graphics processing unit (GPU), an Advanced RISC Machines (ARM) processor or some other processor. Although FIG. 2A includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2A, the memory 227 stores one or more of the following: sensor data 293; identity data 295; 3D overlay data 297; tracking data 298; and image recognition data 299.

The sensor data 293 may include data describing one or more measurements recoded by one or more of the sensors included in the sensor set 233. For example, the sensor data 293 includes LIDAR data describing the distance from the first client device 103 and the second client device 188 on a roadway which is being traveled by the first client device 103 and the second client device 188.

The identity data 295 may include data used to identify the second client device 188. For example, the identity data 295 may include GPS coordinates for the second client device 188.

For example, the second client device 188 may be a vehicle that is equipped with a DSRC-compliant GPS unit that is operable to provide GPS data that describes the location of the second client device 188 to a lane-level degree of precision. The DSRC standard requires that GPS data be precise enough to identify which lane a vehicle is traveling in. The DSRC-compliant GPS unit may be operable to identify, monitor and track its two-dimensional position within 1.5 meters (i.e., "1 sigma") of the time. In other words, when comparing the actual position of the vehicle to the position described by the GPS data generated by the DSRC-compliant GPS unit, there is at least an 84% chance that the position described by the GPS data is within 1.5 meters (i.e., <1.5 meters) of the actual position of the vehicle when the GPS sensor of the vehicle is under an open sky (i.e., the sky is viewable by the GPS sensor of the vehicle). Since lanes and vehicles are typically less than 3 meters wide, whenever the 2D error of the GPS data is <1.5 meters the first client device 103 described herein may analyze the GPS data and know a location of the second client device 188 that is accurate to within 1.5 meters. The GPS data included in the identity data 295 may be transmitted direction by the second client device 188 or received from the overlay server 190.

In some implementations, there is at least a 68.2% chance that the position described by the GPS data is within 1.5 meters (i.e., <1.5 meters) of the actual position of the vehicle under an open sky (i.e., the sky is viewable by the GPS sensor).

In some implementations the second client device 188 and the first client device 103 may be operable to send and receive messages via DSRC and the second client device 188 may transmit a basic safety message (BSM) that includes data describing the location of the second client device. The first client device 103 may receive the BSM. The BSM may be periodically transmitted (e.g., once every one second, once every ten seconds, once every tenth of a second, etc.) to update the location of the second client device 188. The BSM or the GPS data included in the BSM may be stored as the identity data 295.

The identity data 295 may include other information used to identity the second client device 188. For example, the second client device 188 may pair with the first client device 103 via a wireless communicative coupling and the identity data 295 may include information that indicates this pairing and is used to identity the second client device 188. The wireless communicative coupling may be a short range communication protocol such as Bluetooth™ or Bluetooth™ Low Energy so that the location of the second client device 188 may be ascertained to be within the range of those protocols.

The identity data 295 may include known images of the second client device 188 that may serve as exemplars for image recognition or information uniquely identifying the second client device 188 (e.g., a license plate number). For example, the second driver 124 may share their location via the social network.

In some implementations, the second driver 124 may transmit identifying information to the first driver 125 via the social network or a messaging application and this identifying information may be included in the identity data 295.

The identity data 295 may be received from the overlay server 190 via the network 105 or received from the second client device 188 via the network 105 or some other direct form of communication.

The 3D overlay data 297 may include graphical data describing one or more 3D overlays. The 3D overlay data 297 may be operable to cause the 3D HUD 231 to display the 3D overlay. For example, the 3D overlay data 297 is received by the 3D HUD 231 and the 3D HUD displays the 3D overlay described by the 3D overlay data 297. The 3D overlay described by the 3D overlay data 297 may be animated.

The 3D overlay data 297 may include information describing where the 3D overlay should be displayed in the 3D HUD 231. For example, the 3D overlay data 297 may include Cartesian coordinates (X, Y, Z) describing where the 3D overlay should be displayed. The Cartesian coordinates may be determined by the overlay module 208 based on the location of the second client device 188 and where the first driver 125 sees the second client device 188 when looking through the 3D HUD 231 so that the 3D overlay is displayed in an orientation where the first driver 125 will perceive the 3D overlay as being proximate to the second client device 188 that is associated with the 3D overlay.

In some implementations, the 3D HUD 231 described herein may include 3D superposition display technology along with a 3D HUD 231 that follows both vehicle's positions and refreshes the locations of the 3D overlays in real-time or substantially real time. In some implementations, the overlay module 208 may include code and routines configured to cause the 3D HUD 231 to display the 3D overlay in the 3D HUD 231 right at the second client device 188 as viewed in the 3D HUD 231 by the first driver 125 by calculating the correct parallax and focus at the same time. The distance between the first client device 103 and the second client device 188 (e.g., as indicated by a LIDAR sensor included in the sensor set 233) may be used by the 3D HUD 231 to display the 3D overlay on the 3D HUD 231.

The tracking data 298 includes information used by the tracking module 210 to track the location of the second client device 188 in the display of the 3D HUD 231 and modify the location of the 3D overlay so that the 3D overlay tracks the position of the second client device 188. The 3D overlay application 199 may receive periodic updates that describe the new location of the second client device 188. Optionally, the location of the second client device 188 may be tracked over time by one or more of the sensors included in the sensor set 233.

The image recognition data 299 may include data used to perform image recognition of second client devices 188 as described herein. For example, the image recognition data 299 may include images of the second client device 188. The image recognition data 299 is an optional feature of the computer system 200.

The 3D HUD 231 is described in more detail below with reference to FIG. 2B. The 3D HUD 231 may be communicatively coupled to the bus 220 via a signal line 232.

The sensor set 233 was described above with reference to FIG. 1, and so, that description will not be repeated here. The sensor set 233 may include one or more internal or external cameras that are mounted to the vehicle. In some implementations, at least one of the cameras is a digital camera mounted to the interior of the first client device 103 and configured to monitor the gaze of the first driver 125 and determine which region of the 3D HUD 231 the first driver 125 is viewing. For example, the interior camera records the first driver's face and, in particular, the first driver's eyes and their gaze relative to the 3D HUD 231.

The sensor set 233 is communicatively coupled to the bus 220 via a signal line 234.

The communication unit 245 transmits and receives data to and from one or more of the elements of the operating environment 100. The communication unit 245 may send and receive data via the network 105 or via direct communicative couplings to the various elements of the operating environment 100. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with one or more elements of the operating environment 100. In some implementations, the communication unit 245 includes a wireless transceiver for exchanging data with the network 105 (or some other element of the operating environment 100) or other communication channels using one or more wireless communication methods, including IEEE 802.11, IEEE 802.16, BLUETOOTH®, DSRC, mmWave communication or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The 3D overlay application 199 includes one or more of the following: a communication module 202, a detection module 204, an identification module 206, an overlay module 208 and a tracking module 210.

The communication module 202 is communicatively coupled to the bus 220 via a signal line 222. The detection module 204 is communicatively coupled to the bus 220 via a signal line 224. The identification module 206 is communicatively coupled to the bus 220 via a signal line 226. The overlay module 208 is communicatively coupled to the bus 220 via a signal line 228. The tracking module 210 is communicatively coupled to the bus 220 via a signal line 229.

The communication module 202 can be software including routines for handling communications between the 3D overlay application 199 and other components of the computer system 200. In some implementations, the communication module 202 can be a set of instructions executable by the processor 225 to provide the functionality described below for handling communications between the 3D overlay application 199 and other components of the computer system 200.

In some implementations, the communication module 202 can be stored in the memory 227 of the computer system 200 and can be accessible and executable by the processor 225.

The communication module 202 receives data and transfers the data, via the communication unit 245, to the other components of the operating environment 100.

The communication module 202 receives data and transfers the data to the other components of the computer system 200. For example, the communication module 202 transmits 3D overlay data 297 to the 3D HUD 231.

The communication module 202 may communicate with the second client device 188 via the communication unit 245. For example, the communication module 202 receives data describing the location of the second client device 188 from the second client device 188 and the communication module 202 stores this location data as identity data 295 or tracking data 298.

The communication module 202 can communicate with elements of the first client device 103. For example, the communication module 202 receives the identity data 295, the 3D overlay data 297, the tracking data 298 or the image recognition data 299 from the overlay server 190 via the network 105.

The detection module 204 can be software including routines for detecting the presence of a second client device 188. For example, the detection module 204 detects the presence of the second client device 188 by analyzing the sensor data 293. The sensor data 293 may include one or more images or LIDAR data that indicates the presence of the second client device 188. The detection module 204 may analyze one or more sprites or other data associated with the 3D HUD 231 to identity the second client device 188. For example, the detection module 204 may analyze data associated with the 3D HUD 231 to identity which object in the 3D HUD 231 corresponds to the second client device 188 indicated by the sensor data 293.

In some implementations, the detection module 204 can be stored in the memory 227 of the computer system 200 and can be accessible and executable by the processor 225.

The identification module 206 can be software including routines for determining the identity of the second client device 188. For example, assume the first client device 103 and the second client device 188 are vehicles driving on the same roadway so that the second client device 188 is viewable by the first driver 125 via the 3D HUD 231. The second client device 188 may be nearby the first client device 103 (e.g., a few meters) or distant from the first client device 103 (e.g., many cars ahead of the first client device 103).

In some implementations, the identification module 206 determines the identity of the second client device 188. For example, the 3D overlay assignment software 198 present of the second client device 188 periodically provides GPS data to the overlay server 190. The GPS data describes the location of the second client device 188 to the overlay server 190. The identification module 206 present on the first client device 103 also periodically provides GPS data to the overlay server 190. The GPS data may describe the location of the first client device 103 to the overlay server 190. In some implementations, the GPS data provided by the second client device 188 and the first client device 103 may be provided in real time (or near real time) to the overlay server 190 optimize the performance of the 3D overlay application 199.

In some implementations, the overlay server 190 determines which second client devices 188 are in the same geographic area as the first client device 103. The overlay server 190 may provide the following data to the 3D overlay application 199 via the network 105: (1) identity data 295 including identifying information associated with second client devices 188 in the same geographic area as the first client device 103 so that the identification module 205 can determine the identities of the second client devices 188 viewable in the 3D HUD 231 by the first driver 125; and (2) 3D overlay data 297 including graphical data for displaying the 3D digital overlays associated with the identified second client devices 188 viewable in the 3D HUD 231 by the first driver 125.

In some implementations, the overlay server 190 may continuously update the 3D overlay application 199 with identification data 295 or tracking data 298 describing the location of the second client devices 188 so that the tracking module 210 can track the location of the second client devices 188 and move the graphic for the 3D overlay associated with the second client devices 188 in real time (or near real time) so that the 3D overlays displayed by the 3D HUD 231 remain up to date over time.

In some implementations, the second client device 188 and the first client device 103 may establish a wireless communicative coupling (e.g., Wi-Fi, 3G, 4G, LTE, DSRC, mmWave communication, mobile data connection, Bluetooth connection, etc.) so that the second client device 188 may update the first client device 103 about the location of the second client device 188 in real time (or near real time) without using the overlay server 190. For example, the second client device 188 may transmit data describing the GPS coordinates of the second client device 188 to the first client device 103 via DSRC or some other form of communicative coupling.

In some implementations, the overlay data 193 stored in the overlay server 190 may be stored locally on the second client device 188 and transmitted to the first client device 103 via a wireless communicative coupling so that the overlay server 190 is not used.

In some implementations, the identification module 206 can be stored in the memory 227 of the computer system 200 and can be accessible and executable by the processor 225.

The overlay module 208 can be software including routines for causing the 3D HUD 231 to display a 3D overlay based on the 3D overlay data 297. Optionally, the 3D overlay data 297 may include data for displaying an animated 3D overlay. The animation may be configured to be subtle so that the second first driver 125 is not distracted.

In some implementations, the overlay module 208 can be stored in the memory 227 of the computer system 200 and can be accessible and executable by the processor 225.

The tracking module 210 can be software including routines for localizing and tracking the second client devices 188 viewable by the first driver 125 in the 3D HUD 231 based on the tracking data 298. The tracking data 298 may be received from the second client device 188 or the overlay server 190. The tracking data 298 may be updated in real time (or near real time).

In some implementations, individual second client devices 188 may be identified based on unique information such as their license plates. The tracking module 210 may analyze images captured by the sensor set 233 to isolate individual second client devices 188 and associate the identifying information with second client device 188.

In some implementations, the tracking module 210 can be stored in the memory 227 of the computer system 200 and can be accessible and executable by the processor 225.

Figure 2B:
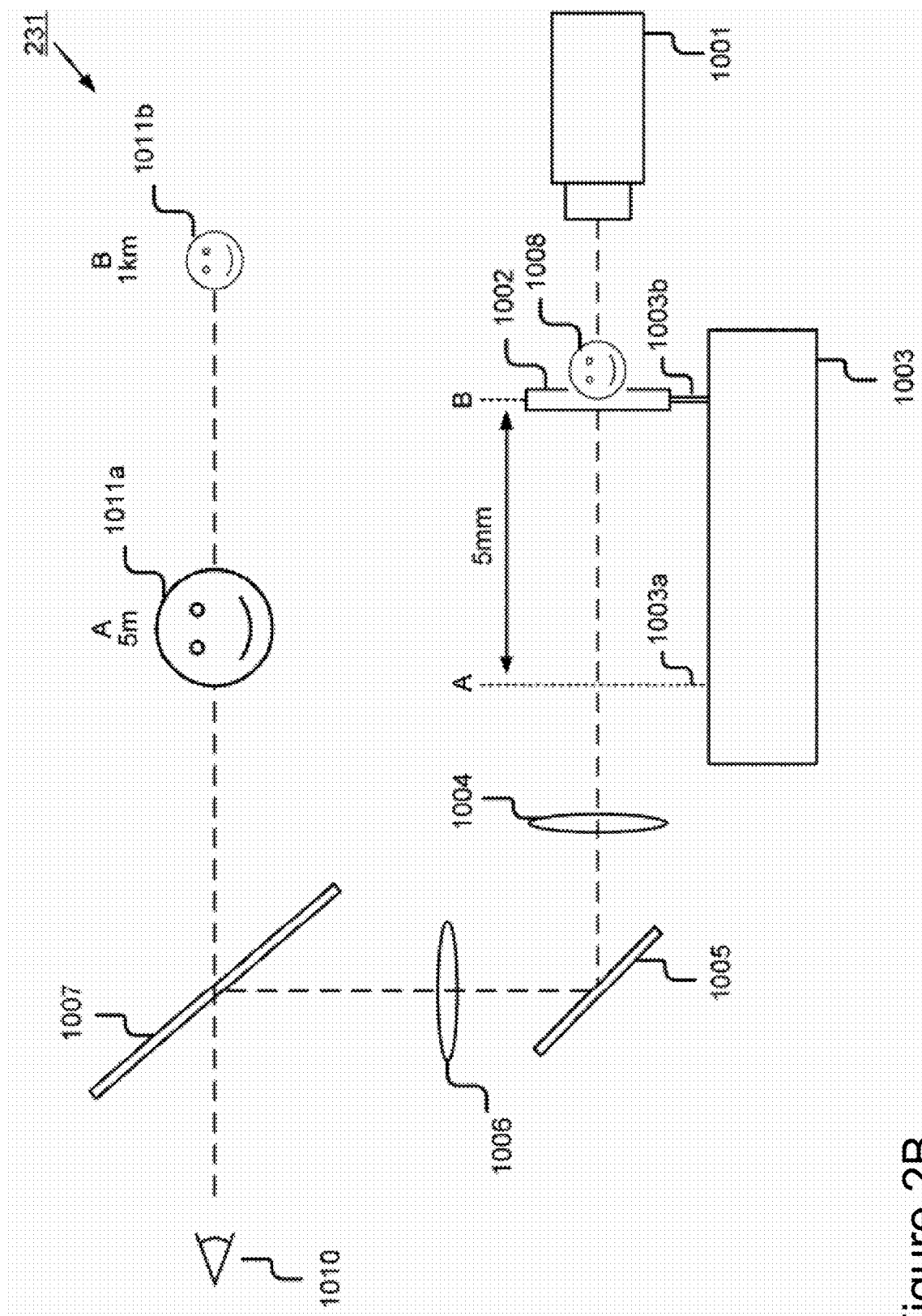
FIG. 2B is a block diagram illustrating an 3D HUD according to some implementations.

Referring to FIG. 2B, depicted is a block diagram illustrating an 3D HUD 231 according to some implementations.

In some implementations, the 3D HUD 231 includes a projector 1001, a movable screen 1002, a screen-driving unit 1003, an optical system (including lenses 1004, 1006, reflector 1005, etc.). The projector 1001 may be any kind of projector such as a digital mirror device (DMD) project, a liquid crystal projector. The projector 1001 projects an image (graphic) 1008 on the movable screen 1002. The movable screen 1002 includes a transparent plate and so the projected image lights transmit through the movable screen 1002 to be projected on the windshield 1007 of a vehicle (first client device 103). The image projected on the windshield 1007 is perceived by a driver 1010 as if it is a real object (shown as 1011a, 1011b) that exists in the three-dimensional space of the real world, as opposed to an object that is projected on the windshield.

In some implementations, the 3D HUD 231 is capable of controlling the direction of the image relative to the driver 1010 (in other words, the image position in the windshield) by adjusting the projection position on the screen 1002. Further the screen 1002 is movable by the screen-driving unit 1003 in the range between the positions 1003a and 1003b. Adjusting the position of the screen 1002 can vary the depth (distance) of the projected image from the driver 1010 in the real world. In one example, the movable range of the screen 1002 (distance between positions 1003a and 1003b) may be 5 mm, which correspond to from 5 m away to infinity in the real world. The use of the 3D HUD 231 allows the driver 1010 to perceive the projected image exist in the real world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D HUD 231 depicted in FIG. 2B is provided by way of example. Other examples are possible. These examples may include heads-up displays having more or less complexity than the 3D HUD 231 depicted in FIG. 2B. For example, it is anticipated that in the future there will be heads-up displays that do not require movable parts such as the movable screen 1002. For example, a static screen that does not move may be deployed. The heads-up display deployed may not be a two-dimensional heads-up display unit. The 3D overlay application 199 described above with reference to FIG. 2A is designed to be operable with such components.

Figure 2C:
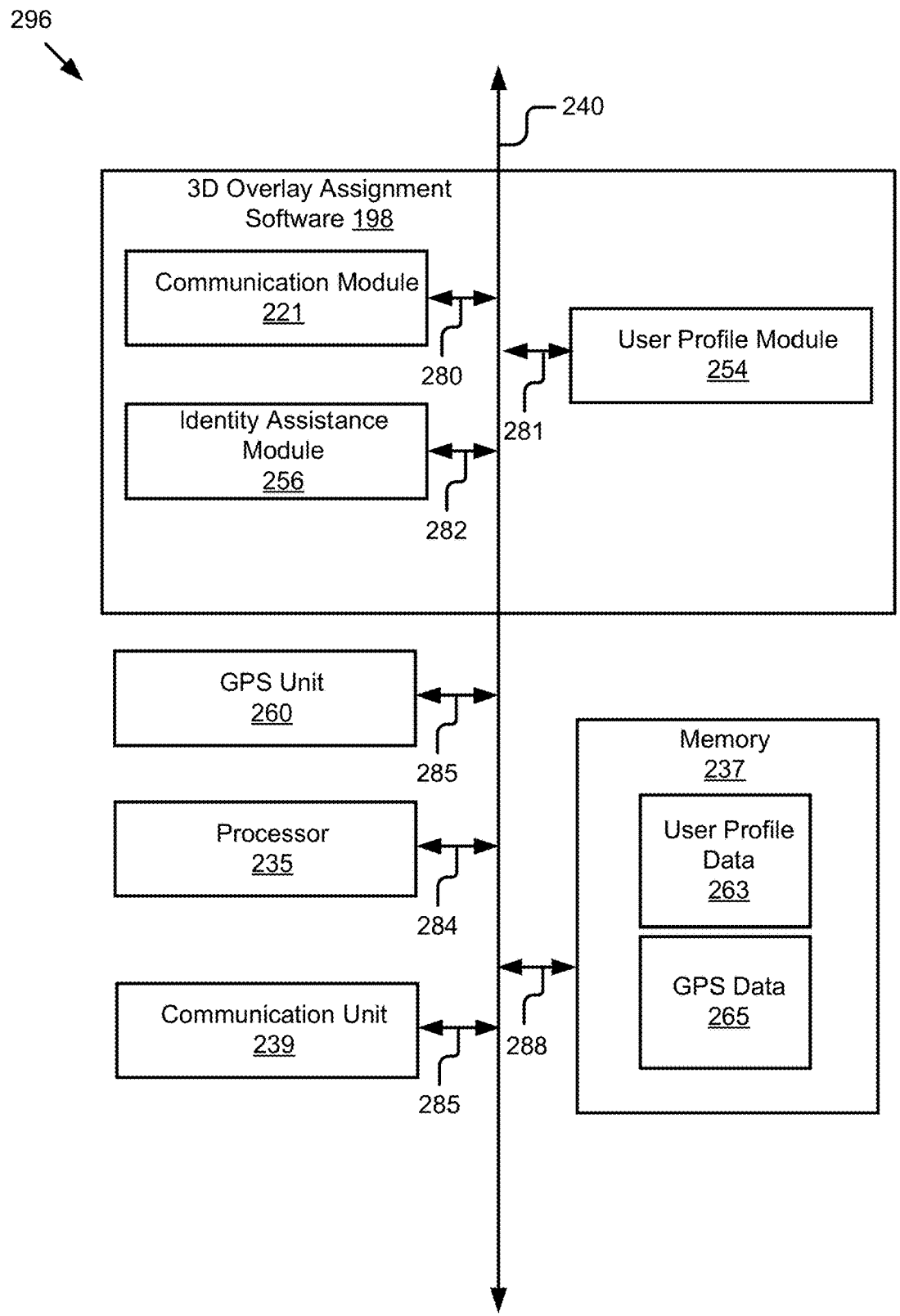
FIG. 2C is a block diagram illustrating an example computer system including 3D overlay assignment software according to some implementations.

Referring now to FIG. 2C, depicted is a block diagram illustrating an example computer system 296 including the 3D overlay assignment software 198 according to some implementations. As depicted, the computer system 296 includes the 3D overlay assignment software 198, a GPS unit 260, a processor 235, a memory 237, and a communication unit 239. The computer system 296 may include the second client device 188. The components of the computer system 296 are communicatively coupled by a bus 240.

The GPS unit 260 includes may include hardware and software for retrieving GPS data 265 for the second client device 188 from a GPS satellite. The GPS unit may be DSRC-compliant. The GPS unit 260 may cause the communication unit 239 to transmit the GPS data 265 to the overlay server 190 or the first client device 103. The GPS unit 260 may retrieve new GPS data 265 on a continual basis (e.g., every second, every tenth of a second, every 10 seconds) and transmit the new GPS data 265 to the overlay server 190 or the client device 103 in real time (or near real time). The GPS unit 260 is coupled to the bus 240 via a signal line 285.

The first client device 103 may include a similar GPS unit for retrieving GPS data for the first client device 103 from the GPS satellite.

The processor 235 and the communication unit 239 are similar to the processor 225 and the communication unit 245 that are discussed with reference to FIG. 2A and, so, these descriptions will not be discussed again. The processor 235 is communicatively coupled to the bus 240 via a signal line 284. The communication unit 239 is communicatively coupled to the bus 240 via a signal line 285

The memory 237 stores instructions or data that may be executed by the processor 235. The memory 237 is coupled to the bus 240 for communication with the other components via a signal line 288. The instructions or data may include code for performing the techniques described herein. The memory 237 may be a dynamic random access memory (DRAM) device, a static random access memory (SRAM) device, flash memory, or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2B, the memory 237 may store any of user profile data 263 and GPS data 265. The user profile data 263 may describe the 3D overlays selected by the second driver 124 for associated with the second driver 124 or the second client device 188. The user profile data 263 may also store security settings for the second driver 124 or the second client device 188. The GPS data 265 includes data describing the GPS coordinates of the second client device 188.

In some implementations, the 3D overlay assignment software 198 includes a communication module 221, a user profile module 254 and an identity assistance module 256.

The communication module 221 may be communicatively coupled to the bus 240 via a signal line 280. The user profile module 254 may be communicatively coupled to the bus 240 via a signal line 281. The identity assistance module 256 may be communicatively coupled to the bus 240 via a signal line 282.

The communication module 221 can be software including routines for handling communications between the 3D overlay assignment software 198 and other components of the computer system 296. In some implementations, the communication module 221 can be a set of instructions executable by the processor 235 to provide the functionality described below for handling communications between the 3D overlay assignment software 198 and other components of the computer system 296. In some implementations, the communication module 221 can be stored in the memory 237 of the computer system 296 and can be accessible and executable by the processor 235.

The communication module 221 sends and receives data, via the communication unit 239, to and from one or more of the elements of the operating environment 100. For example, the communication module 221 transmits, via the communication unit 239, the user profile data 263 to the overlay server 190. In another example, the communication module 221 receives GPS data 265 from a GPS satellite (not pictured).

In some implementations, the communication module 221 receives data from components of the 3D overlay assignment software 198 and stores the data in the memory 237.

In some implementations, the communication module 221 may handle communications between components of the 3D overlay assignment software 198.

The user profile module 254 can be software including routines for providing a GUI to be displayed on a screen and receive inputs from the second driver 124. The GUI may include graphical elements that enable the second driver 124 to select a 3D overlay to associate with the second driver 124 or the second client device 188. The GUI may also include graphical elements for providing other profile information such as the security settings for the user profile, the name of the second driver 124, the make and model of the second client device 188, login information for social network accounts, etc. The graphical data for generating the GUI may be stored in the memory 237.

In some implementations, the user profile module 254 can be stored in the memory 237 of the computer system 296 and can be accessible and executable by the processor 235.

The identity assistance module 256 can be software including routines for providing identifying information for the second client device 188 to the first client device 103 or the overlay server 190. The identifying information may include the GPS data 265 for the second client device 188, a picture of the second client device 188, a license plate number for the second client device 188 or some other identifying information for the second client device 188.

In some implementations, the identity assistance module 256 can be stored in the memory 237 of the computer system 296 and can be accessible and executable by the processor 235.

Example 3D Overlays

Referring to FIG. 3A, depicted is a graphic representation of example 3D digital bumper sticker 300 displayed in a 3D HUD 231 according to some implementations. In this example, the 3D overlay reads "BABY ON BOARD" and includes an image of clothing associated with a baby.

The 3D overlay included in this example may advertise a new child birth or advise other vehicles to be cautious when driving near this vehicle since a baby is a passenger of the vehicle.

The 3D overlay included in this example is displayed in the 3D HUD 231 at a first location in the 3D HUD that is proximate to a second location of the vehicle in the 3D HUD 231 as viewed by the first driver. For example, the graphical overlay is displayed in the 3D HUD at a position that is near the vehicle (in this example, partially obscuring the vehicle) so that the first driver may assume that the graphical overlay is associated with this vehicle as opposed to some other vehicle that may be viewable in the 3D HUD 231.

In some implementations, the digital image of the clothing included in the 3D overlay may be animated.

Referring to FIG. 3B, depicted is a graphic representation of example 3D digital bumper sticker 305 displayed in a 3D HUD 231 according to some implementations. In this example, the 3D overlay reads "ECO SAVER" and includes an image of plant leaves.

The 3D overlay included in this example may promote eco awareness or advertise a point of view.

Referring to FIG. 3C, depicted is a graphic representation of example 3D digital bumper sticker 310 displayed in a 3D HUD 231 according to some implementations. In this example, the 3D overlay reads "BREAST CANCER SUPPORTER" and includes an image of a pink ribbon or some other color of ribbon.

The 3D overlay included in this example may promote breast cancer awareness.

Referring to FIG. 4A, depicted is a graphic representation of an example 3D badge of accomplishment 400 displayed in a 3D HUD 231 according to some implementations. In this example, the 3D overlay reads "The Golden Tire—100,000 miles" and includes an image of a tire.

The 3D overlay included in this example may advertise that the vehicle has at least 100,000 miles on the odometer.

In some implementations, the wheel may be animated so that it slowly turns (e.g., 1 rotation per minute).

Referring to FIG. 4B, depicted is a graphic representation of an example 3D badge of accomplishment 405 displayed in a 3D HUD 231 according to some implementations. In this example, the 3D overlay reads "Explorer" and includes an image of an outdoor scene.

The 3D overlay included in this example may advertise that the vehicle has traveled to many places or that the driver of the vehicle enjoys exploration or considers themselves to be an explorer.

Referring to FIG. 4C, depicted is a graphic representation of an example 3D badge of accomplishment 410 displayed in a 3D HUD 231 according to some implementations. In this example, the 3D overlay reads "Off-Road Master" and includes an image of an off-road vehicle.

The 3D overlay included in this example may advertise that the vehicle has been used for off-roading or that the driver of the vehicle enjoys off-roading or considers themselves to be an off-roader.

Referring to FIG. 5A, depicted is a graphic representation of an example 3D digital bumper sticker 500 displayed in the 3D HUD 231 for a second vehicle that is more than one vehicle in front of the first vehicle according to some implementations.

The 3D overlays included in this example are displayed in the 3D HUD 231 at locations in the 3D HUD that are proximate to the locations of the vehicles in the 3D HUD 231 with which they are associated. The third vehicle in the 3D HUD 231 may not have a graphical overlay displayed in the 3D HUD 231 due to their security settings or the vehicle being manufactured by a different manufacturer that does not provide the 3D overlay functionality described herein.

Figure 5B:
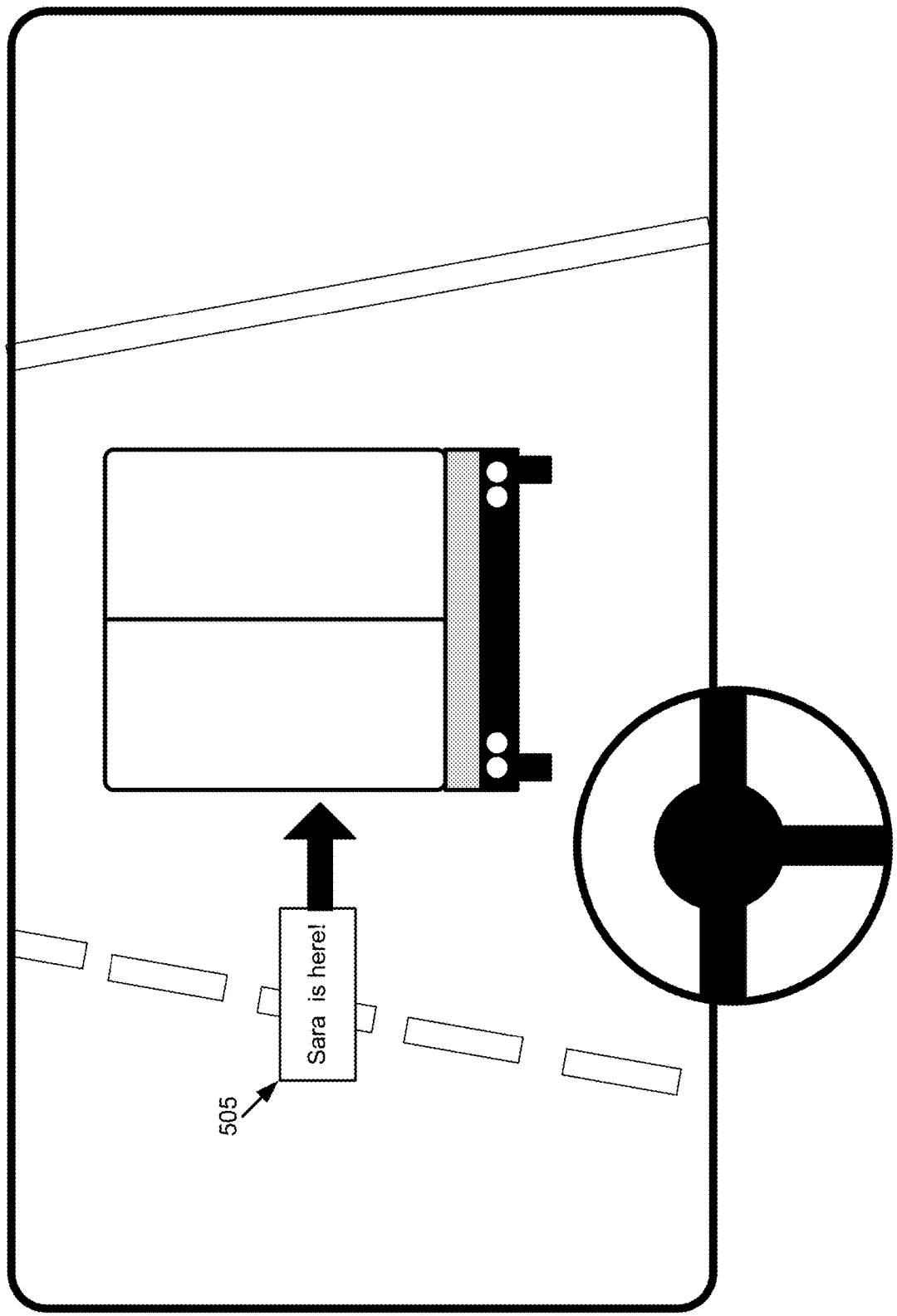
FIG. 5B is a graphic representation of an example 3D overlay displayed in the 3D HUD for a second vehicle that is not viewable by the driver of the first vehicle according to some implementations.

Referring to FIG. 5B, depicted is a graphic representation of an example 3D overlay 505 displayed in the 3D HUD 231 for a second vehicle that is not viewable by the driver of the first vehicle according to some implementations. For example, a semi-truck viewable in the 3D HUD 231 occludes the first vehicle that includes the 3D HUD 231 from seeing the second vehicle associated with the 3D overlay 505.

Figure 6:
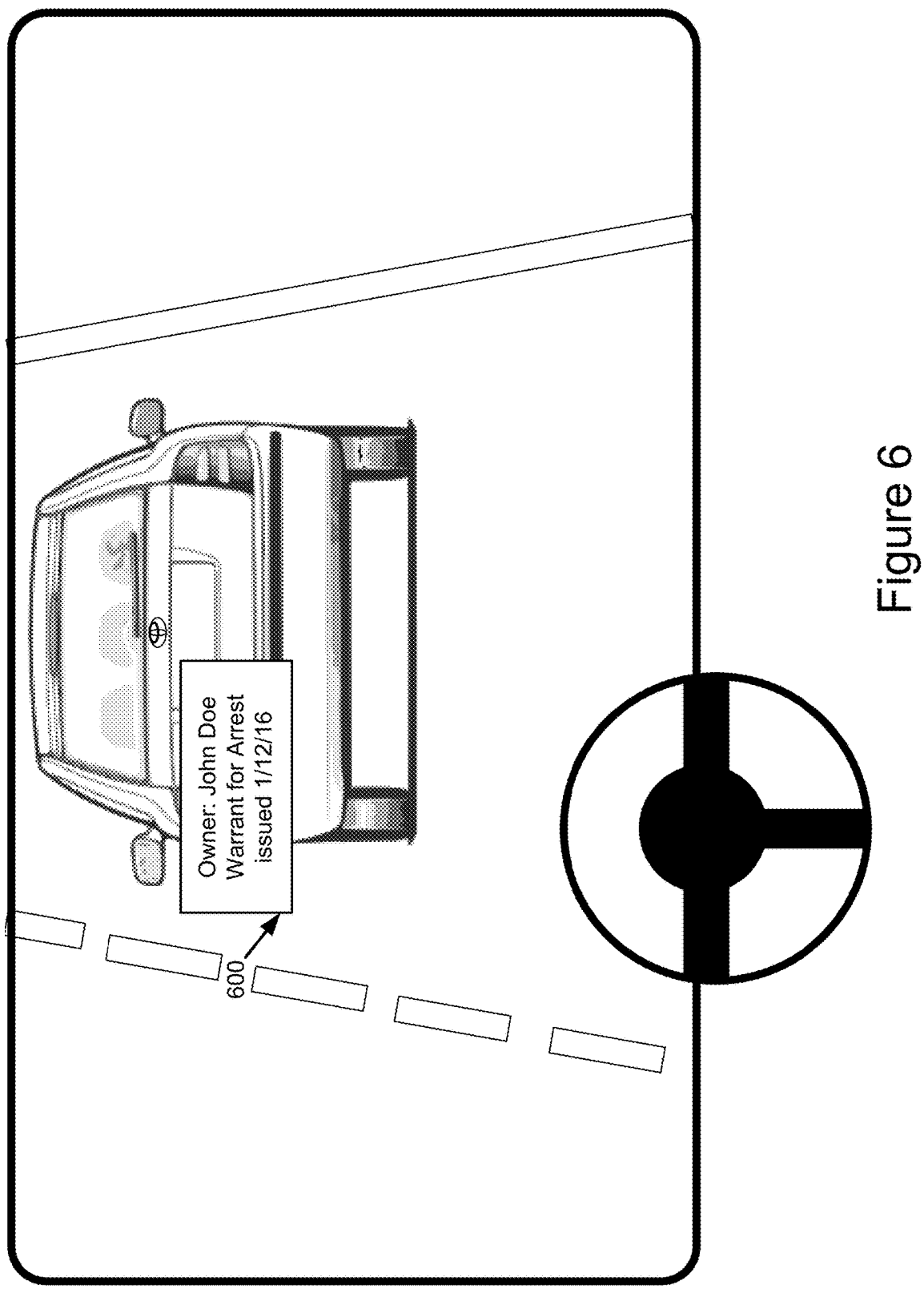
FIG. 6 is a graphic representation of an example 3D overlay displayed in the 3D HUD for a government vehicle according to some implementations.

Referring to FIG. 6, depicted is a graphic representation of an example of 3D overlay 600 displayed in the 3D HUD 231 for a government vehicle according to some implementations.

Methods

Figure 7:
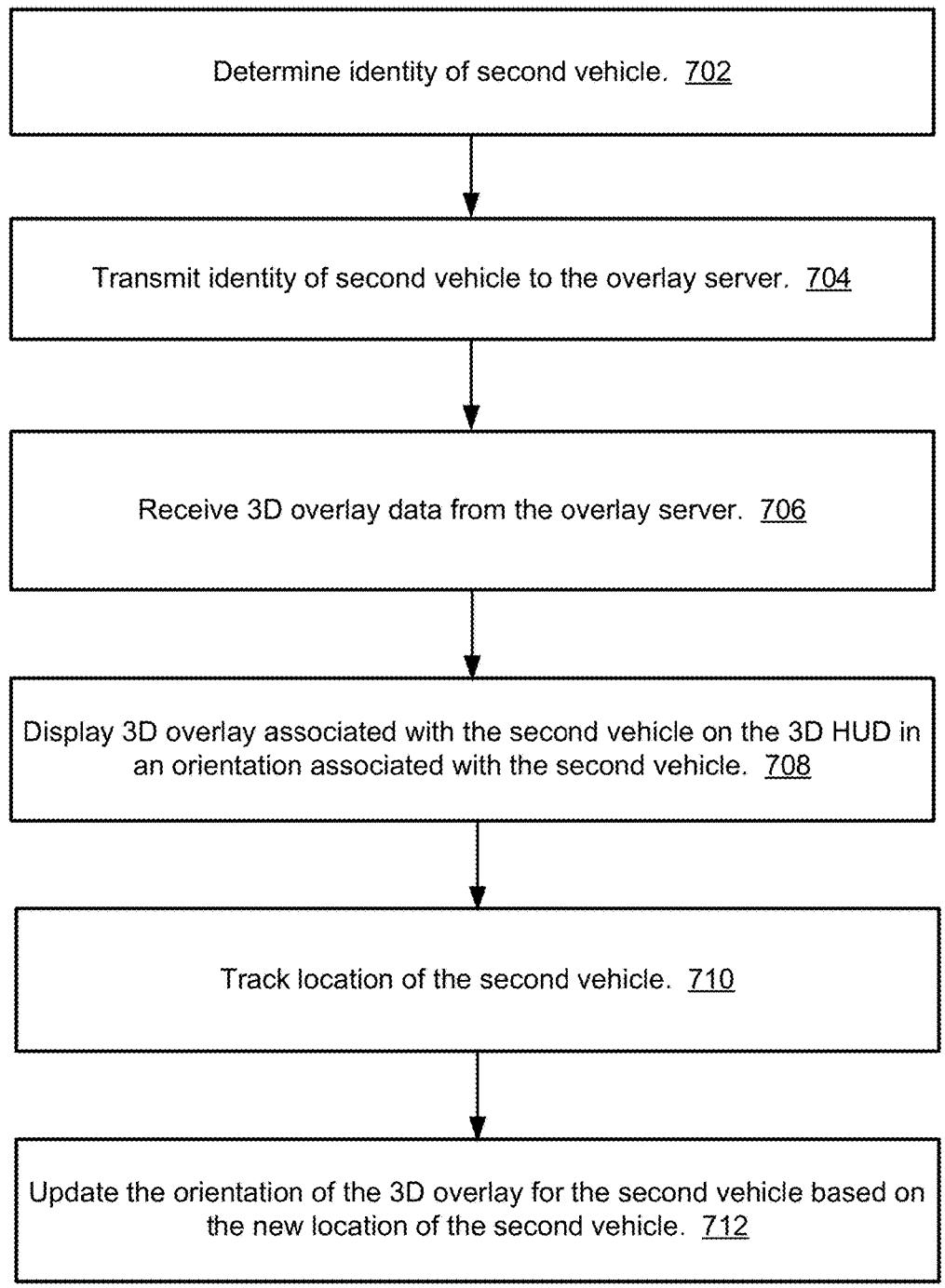
FIG. 7 is a flowchart of an example method for displaying a 3D overlay in a 3D HUD according to some implementations.

FIG. 7 is a flowchart of an example method 700 for displaying a 3D overlay in a 3D HUD 231 according to some implementations. In some implementations, the 3D overlay application 199 may include code and routines configured to cause the processor 225 to execute one or more steps of the method 700 upon being executed by the processor 225.

At step 702 an identity of a second vehicle may be determined. The second vehicle may include the second client device 188.

At step 704, the identity of the second vehicle may be transmitted to the overlay server 190.

At step 706, 3D overlay data 297 may be received from the overlay server 190.

At step 708, a 3D overlay associated with the second vehicle may be displayed on the 3D HUD 231. The 3D overlay may be displayed in the 3D HUD 231 in an orientation associated with the second vehicle.

At step 710, the location of the second vehicle may be tracked. For example, the overlay server 190 may transmit GPS data describing the location of the second vehicle.

At step 712, the orientation of the 3D overlay may be updated based on a new location of the second vehicle.

In the above description, for purposes of explanation, numerous specific details are set forth in order to provide a thorough understanding of this disclosure. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in this disclosure to "some implementations" or "some instances" means that a particular feature, structure, or characteristic described in connection with the implementations or instances can be included in at least one implementation of the description. The appearances of the phrase "in some implementations" in various places in this disclosure are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of this disclosure can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

This disclosure can take the form of some entirely hardware implementations, some entirely software implementations or some implementations containing both hardware and software elements. In some preferred implementations, this disclosure is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The computer-readable medium may be a tangible or non-transitory computer-readable storage medium. The computer-readable medium may store computer executable code. The computer-readable medium may be communicatively coupled to a processor. The processor may be programmed to execute one or more portions of the computer-executable code.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, this disclosure is not described with reference to any particular programming language. It will be appreciated that a variety of programming languages may be used to implement the teachings of this disclosure as described herein.

The foregoing description of the implementations of this disclosure has been presented for the purposes of illustration and description. It is not intended to be exhaustive or to limit this disclosure to the precise form disclosed. Many modifications and variations are possible in light of the above teaching. It is intended that the scope of the disclosure be limited not by this detailed description, but rather by the claims of this application. As will be understood by those familiar with the art, this disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement this disclosure or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of this disclosure is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of this disclosure, which is set forth in the following claims.

What is claimed is:

1. A computer-implemented method comprising:
    receiving identifying information for a second vehicle based on global positioning system ("GPS") data, wherein the GPS data is included in a first wireless communication;
    determining that the second vehicle is viewable by a first driver of a first vehicle through a three-dimensional heads-up display unit ("3D HUD") of the first vehicle that is driven by the first driver;
    determining an identity of the second vehicle based on the identifying information for the second vehicle;
    determining, based on a permission provided by a second driver of the second vehicle, that the first driver is associated with the second driver and that the first driver has permission to view three dimensional overlay data ("3D overlay data") associated with the second driver;
    responsive to determining that the first driver has permission, receiving, from the second vehicle, the 3D overlay data via a second wireless communicative coupling shared between the first vehicle and the second vehicle;
    identifying the 3D overlay data associated with the second vehicle based on the identity of the second vehicle; and
    displaying a 3D overlay in the 3D HUD of the first vehicle based on the 3D overlay data, wherein the 3D overlay is displayed in the 3D HUD at a first location in the 3D HUD that is proximate to a second location of the second vehicle in the 3D HUD as viewed by the first driver so that the first driver does not need to adjust their eye focus to view the 3D overlay and wherein the 3D overlay includes a digital bumper sticker with an animation selected by the second driver of the second vehicle.

2. The method of claim 1, wherein the second vehicle and the first vehicle are communicatively coupled to an overlay server via a wireless network, wherein the second vehicle periodically updates the overlay server by transmitting location data to the overlay server via the wireless network, wherein the location data describes a geographic location of the second vehicle and the overlay server provides the location data to the first vehicle via the wireless network, and wherein determining the identity of the second vehicle is further based on the first vehicle analyzing the location data.

3. The method of claim 1, wherein the 3D overlay includes traffic updates provided by other users associated with a social network.

4. The method of claim 1, wherein the 3D overlay includes a badge of accomplishment that is earned by one or more of the second driver and the second vehicle.

5. The method of claim 1, wherein the second vehicle is separated on a roadway from the first vehicle by one or more other vehicles.

6. The method of claim 5, wherein:
    the one or more other vehicles prevent the second vehicle from being viewable by the first driver; and
    the 3D overlay includes an identification of the second driver of the second vehicle and an indication of the second location of the second driver.

7. The method of claim 1, wherein the first vehicle and the second vehicle are manufactured by a same company and a three dimensional overlay feature ("3D overlay feature") of the 3D HUD is only operable if both the first vehicle and the second vehicle are manufactured by the same company.

8. The method of claim 1, wherein the 3D overlay includes a traffic update provided by the second driver.

9. The method of claim 1, wherein the first vehicle is associated with a governmental agency and the 3D overlay describes a legal status of one or more of the second driver and the second vehicle.

10. The method of claim 1, wherein the GPS data is included in a basic safety message ("BSM") transmitted via the first wireless communication and the BSM was generated with a dedicated short range communication ("DSRC")-enabled GPS unit.

11. The method of claim 1, wherein the second wireless communicative coupling includes dedicated short range communication ("DSRC").

12. The method of claim 1, wherein the second wireless communicative coupling includes millimeter wave communication ("mmWave communication").

13. A computer program product comprising a non-transitory computer-usable medium including a computer-readable program, wherein the computer-readable program when executed on a computer causes the computer to:
    receive identifying information for a second vehicle based on global positioning system ("GPS") data, wherein the GPS data is included in a first wireless communication;
    determine that the second vehicle is viewable by a first driver of a first vehicle through a three-dimensional heads-up display unit ("3D HUD") of the first vehicle that is driven by the first driver;
    determine an identity of the second vehicle based on the identifying information for the second vehicle;
    determine, based on a permission provided by a second driver of the second vehicle, that the first driver is associated with the second driver and that the first driver has permission to view three dimensional overlay data ("3D overlay data") associated with the second driver;
    responsive to determining that the first driver has permission, receive, from the second vehicle, 3D overlay data via a second wireless communicative coupling shared between the first vehicle and the second vehicle;

identify the 3D overlay data associated with the second vehicle based on the identity of the second vehicle; and display a 3D overlay in the 3D HUD of the first vehicle based on the 3D overlay data, wherein the 3D overlay is displayed in the 3D HUD at a first location in the 3D HUD that is proximate to a second location of the second vehicle in the 3D HUD as viewed by the first driver so that the first driver does not need to adjust their eye focus to view the 3D overlay and wherein the 3D overlay includes a digital bumper sticker with an animation selected by the second driver of the second vehicle.

14. The computer program product of claim 13, wherein the second vehicle and the first vehicle are communicatively coupled to an overlay server via a wireless network, wherein the second vehicle periodically updates the overlay server by transmitting location data to the overlay server via the wireless network, wherein the location data describes a geographic location of the second vehicle and the overlay server provides the location data to the first vehicle via the wireless network, and wherein determining the identity of the second vehicle is further based on the first vehicle analyzing the location data.

15. The computer program product of claim 14, wherein the second vehicle is separated on a roadway from the first vehicle by one or more other vehicles.

16. The computer program product of claim 13, wherein the 3D overlay includes a chat interface where the first driver interacts with other users about traffic.

17. The computer program product of claim 13, wherein the 3D overlay includes a badge of accomplishment that is earned by one or more of the second driver and the second vehicle.

18. A system comprising:

a three-dimensional heads-up display unit ("3D HUD") installed in a first vehicle; and a memory storing instructions that, when executed, cause the system to:

receive identifying information for a second vehicle based on global positioning system ("GPS") data, wherein the GPS data is included in a first wireless communication;

determine that the second vehicle is viewable by a first driver of a first vehicle through a three-dimensional heads-up display unit ("3D HUD") of the first vehicle that is driven by the first driver;

determine an identity of the second vehicle based on the identifying information for the second vehicle;

determine, based on a permission provided by a second driver of the second vehicle, that the first driver is associated with the second driver and that the first driver has permission to view three dimensional overlay data ("3D overlay data") associated with the second driver;

responsive to determining that the first driver has permission, receive, from the second vehicle, three dimensional overlay data ("3D overlay data") via a second wireless communicative coupling shared between the first vehicle and the second vehicle;

identify the 3D overlay data associated with the second vehicle based on the identity of the second vehicle; and display a 3D overlay in the 3D HUD of the first vehicle based on the 3D overlay data, wherein the 3D overlay is displayed in the 3D HUD at a first location in the 3D HUD that is proximate to a second location of the second vehicle in the 3D HUD as viewed by the first driver so that the first driver does not need to adjust their eye focus to view the 3D overlay and wherein the 3D overlay includes a digital bumper sticker with an animation selected by the second driver of the second vehicle.

19. The system of claim 18, wherein the second vehicle and the first vehicle are communicatively coupled to an overlay server via a wireless network, wherein the second vehicle periodically updates the overlay server by transmitting location data to the overlay server via the wireless network, wherein the location data describes a geographic location of the second vehicle and the overlay server provides the location data to the first vehicle via the wireless network, and wherein determining the identity of the second vehicle is further based on the first vehicle analyzing the location data.

20. The system of claim 18, wherein the 3D overlay includes traffic updates provided by other users associated with a social network.

\* \* \* \* \*